(12) United States Patent
Sekine et al.

(10) Patent No.: US 7,227,680 B2
(45) Date of Patent: Jun. 5, 2007

(54) OPTICAL WAVELENGTH CONVERSION METHOD, OPTICAL WAVELENGTH CONVERSION SYSTEM, PROGRAM AND MEDIUM, AND LASER OSCILLATION SYSTEM

(75) Inventors: Ichiro Sekine, Ibaraki-ken (JP); Hiroyuki Shiraishi, Ibaraki-ken (JP); Hirokazu Kato, Ibaraki-ken (JP); Genta Masada, Ibaraki-ken (JP); Noriko Watanabe, Ibaraki-ken (JP)

(73) Assignee: Mitsubishi Materials Corporation, Tokyo (JP)

(*) Notice: Subject to any disclaimer, the term of this patent is extended or adjusted under 35 U.S.C. 154(b) by 142 days.

(21) Appl. No.: 10/477,753

(22) PCT Filed: May 23, 2002

(86) PCT No.: PCT/JP02/05005

§ 371 (c)(1),
(2), (4) Date: Jun. 30, 2004

(87) PCT Pub. No.: WO02/097527

PCT Pub. Date: Dec. 5, 2002

(65) Prior Publication Data

US 2004/0246565 A1 Dec. 9, 2004

(30) Foreign Application Priority Data

| May 25, 2001 | (JP) | 2001-157289 |
|---|---|---|
| May 29, 2001 | (JP) | 2001-160946 |
| May 29, 2001 | (JP) | 2001-160948 |
| Sep. 12, 2001 | (JP) | 2001-276640 |
| Dec. 21, 2001 | (JP) | 2001-389862 |

(51) Int. Cl.
*G02F 1/35* (2006.01)

(52) U.S. Cl. ..................................... 359/326
(58) Field of Classification Search ........ 359/326–332; 385/122; 372/21–22
See application file for complete search history.

(56) References Cited

U.S. PATENT DOCUMENTS

| 3,639,776 A * | 2/1972 | Fay et al. .................... 359/328 |
|---|---|---|
| 3,670,258 A * | 6/1972 | Magnante .................... 359/328 |
| 3,721,831 A * | 3/1973 | Bergman et al. ............ 359/328 |
| 4,331,891 A | 5/1982 | Rizzo |
| 4,346,314 A | 8/1982 | Craxton |
| 5,721,748 A * | 2/1998 | Injeyan et al. .................. 372/3 |
| 5,805,626 A * | 9/1998 | Komatsu et al. .............. 372/41 |
| 5,835,513 A * | 11/1998 | Pieterse et al. ................ 372/22 |
| 5,935,467 A * | 8/1999 | Unternahrer et al. ......... 219/390 |
| 6,526,072 B1 * | 2/2003 | Sugawara et al. ............ 372/21 |

FOREIGN PATENT DOCUMENTS

| EP | 767396 | 4/1997 |
|---|---|---|
| EP | 919852 | 6/1999 |
| JP | 63-279231 | 11/1988 |
| JP | 3-065597 | 3/1991 |
| JP | 06-265956 | 9/1994 |
| JP | 9-22037 | 1/1997 |
| JP | 9-258283 | 10/1997 |
| JP | 10-508798 | 9/1998 |
| JP | 11-326969 | 11/1999 |
| JP | 11-326973 | 11/1999 |
| JP | 2000-216465 | 8/2000 |
| JP | 2000-292819 | 10/2000 |
| JP | 2000-321608 | 11/2000 |
| JP | 2001-144356 | 5/2001 |
| WO | 98/52260 | 11/1998 |

OTHER PUBLICATIONS

J.Y. Zhang et al.: "Second-harmonic generation from regeneratively amplified femtosecond laser pulses in BBO and LBO crystals" Journal of the Optical Society of America B, vol. 15, No. 1, pp. 200-209, Jan. 1998.

V.G. Dmitriev et al.: "Effect of two-photon radiation absorption on second harmonic generation" Soviet Journal of Quantum Electronics, vol. 9, No. 3, pp. 300-303 Mar. 1979.

R. Komatsu et al.: "Growth and ultraviolet application of LI2B407 crystals: Generation of the fourth and fifth harmonics onf Nd: Y3AI5012 lasers" Applied Physics Letters, vol. 70, No. 26, pp. 3492-3494, Jun. 30, 1997.

K. Kuroda et al.: "Parametric study on the second harmonic generation of a copper vapor laser" Proceedings of the SPIE—The International Society for Optical Engineering, vol. 1041, pp. 60-66 1989.

P. Kerkoc et al.: "Thermal effects on second-harmonic generation in biaxial molecular crystals" Journal of the Optical Society of America B, vol. 16, No. 10, pp. 1686-1691, Oct. 1999.

Shin-ichi Furusawa, et al., "Second Harmonic Generation in $Li_2B_4O_7$", Journal of the Physical Society of Japan, vol. 50, No. 8, Aug. 1991, pp. 2691-2693 w/attachment.

K. Kato, "Temperature-Tuned 90' Phase-Matching Properties of $LIB_3O_5$", IEE Journal of Quantum Electronics, vol. 30, No. 12, Dec. 1994, pp. 2950-2952.

Shujjie Lin et al., "Phase-Matching Retracing Behavior for Second Harmonic Generation in $LIB_3O_5$ Crystal", 1993, American Institute of Physics, pp. 1029-1034.

Baichang Wu, et al., "Type-I and Type-II Noncritical Phase Matching of $LiB_3O_5$ Crystal", 1993, American Institute of Physics, pp. 7108-7110.

* cited by examiner

*Primary Examiner*—Michelle Connelly-Cushwa
(74) *Attorney, Agent, or Firm*—Oblon, Spivak, McClelland, Maier & Neustadt, P.C.

(57) ABSTRACT

In an optical wavelength converting method in which light from a laser oscillator that oscillates coherent light of an inherent wavelength λ is employed as incident light, and is made to input to a nonlinear optical crystal, and light having a wavelength of ½λ is radiated, the wavelength of the incident light is 1000 nm or less, and the peak power density of the incident light is 0.1–10 fold greater than the peak power density that provides the maximum conversion efficiency. The nonlinear optical crystal is heated to and maintained at 200–600° C. Prescribed fundamental waves are input to a first crystal and a second crystal sequentially. The first crystal has a higher bulk damage threshold value with respect to the fundamental waves than that of the second crystal. The second crystal has a higher effective nonlinear constant with respect to the fundamental waves than that of the first crystal.

23 Claims, 6 Drawing Sheets

OPTICAL WAVELENGTH CONVERSION METHOD, OPTICAL WAVELENGTH CONVERSION SYSTEM, PROGRAM AND MEDIUM, AND LASER OSCILLATION SYSTEM

TECHNICAL FIELD

The present invention relates to an optical wavelength converting method, and an optical wavelength converting system, program, and medium, that are employed in a laser oscillator. More specifically, the present invention relates to an optical wavelength converting method, and to an optical wavelength converting system, program and data medium, wherein coherent light is input to a nonlinear optical crystal, and in particular on a lithium tetraborate ($Li_2B_4O_7$, referred to as "LB4" hereinafter) single crystal, that is employed as a second harmonic wave generation element, and then radiates this light after converting it to light having one-half the original wavelength. In addition, the present invention relates to an optical wavelength converting method, an optical wavelength converting system, and a laser oscillating system that are capable of obtaining with good efficiency second harmonic, third harmonic and other such high power sum frequency waves.

BACKGROUND ART

When employed as the light source for recording data into or reading data out from a recording medium, short-wavelength laser light has the advantage of enabling an increased recording density. In addition, short-wavelength laser light is also advantageous when employed in material processing applications, as its heat effects are small and it makes precision processing possible. Short-wavelength laser light is also being used such as a light source in the medical field, and a lithography light source for a very large-scale integrated circuit.

Thus, short-wavelength laser light is desired in many diverse fields. Accordingly, there has been a demand for a small, lightweight, long-lasting light source that stably radiates short-wavelength laser light.

However, a suitable light source that radiates light having a wavelength of 500 nm or less has not been conventionally available. For example, while semiconductor lasers are known that can radiate laser light having wavelengths of up to 400 nm, these devices have been problematic because of their extremely low output.

Excimer lasers are available as examples of short-wavelength large-output lasers. These lasers were first realized in 1970 by Basov et al in the former Soviet Union using a method of exciting liquid xenon (Xe) with an electronic beam. In 1976, these lasers were successfully oscillated using electric discharge pumping. In excimer lasers of this type, i.e., employing electric discharge pumping, ultraviolet light is generated by compounds such as ArF (193 nm), KrF (248 nm), or XeCl (308 nm) in an ultraviolet pulse repetition oscillating laser, amplified using an optical resonator, and then output as laser light. Application of excimer lasers has been much anticipated in fields such as polymer ablation, surface reforming, marking, thin film formation, medical product manufacturing, and isotope separation. However, when pulse lasers which repeatedly generate several hundred pulses per second are used as excimer lasers, they can only generate a $10^{-9}$ second pulse light every $10^{-2}$ seconds. That is, the duration during which the laser is being generated is extremely short compared to the interval, so that application of excimer lasers in a deposition process or the processing steps employed in the aforementioned fields is problematic. Furthermore, excimer lasers are also problematic with respect to the short lifespan of the gas medium, difficulty in reducing the size of the laser device, poor maintenance, high operational costs, employment of toxic gases, etc. Thus, the practical utilization of semiconductor lasers, etc. that can generate light in the ultraviolet region at room temperature, stably and over a long period of time, has yet to be realized.

There has therefore been increased research activity in recent years in the area of nonlinear optical elements such as second harmonic-wave generating (SHG) elements. SHG elements generate light having one-half the wavelength of the incident light so that, for example, light in the ultraviolet region can be generated using laser light in the infrared region. Thus, the industrial value of this technology in various fields of application is extremely large.

Conventionally known crystals employed as wavelength converting elements like SHG elements include KTP ($KTiOPO_4$) disclosed in Japanese Unexamined Patent Application, First Publication No. Hei 3-65597, and BBO ($\beta$-$BaB_2O_4$), CLBO ($CsLiB_6O_{10}$), LBO ($LiB_3O_5$), and KDP ($KH_2PO_4$), etc. disclosed in Japanese Unexamined Patent Application, First Publication No. Sho 63-279231.

However, in the case of a wavelength converting element employing KTP, not only is it difficult to increase the size of the crystal, but the refractive index varies inside the crystal. Accordingly, even in the case of KTP elements that are cut from a single crystal, the refractive indices will differ from one another. As a result, the phase matching angles differ, making it difficult to realize a wavelength converting element that is highly precise. Further, since pores are readily generated in a KTP type crystal, it is difficult to supply a large amount of high-quality KTP crystals.

In addition, while converting elements employing BBO or CLBO have high conversion efficiency, they are problematic with respect to resistance to moisture and laser damage, and output destabilization due to two photon absorption.

In converting elements employing LBO, the shortest SHG wavelength (second harmonic wave) is 277 nm, so that the wavelength conversion range is narrow. For this reason, these devices cannot generate the fourth harmonic wave (266 nm) of an Nd:YAG laser. Further, another disadvantage is that a large crystal is not possible.

In converting elements employing KDP, phase mismatching arises due to the effects of heat absorbed at a high repetition rate. Accordingly, these elements cannot be used unless a low repetition rate of 100 Hz or less is employed. In addition, at a high repetition rate, the threshold for damage is extremely low. Accordingly, it is difficult to employ this device in laser oscillators used in manufacturing or industrial applications that are employed at repetition rates exceeding 1 kHz.

The present applicant therefore previously proposed a wavelength converting method employing an LB4 ($Li_2B_4O_7$) single crystal as a converting element (Japanese Patent Application No. Hei 8-250523).

This LB4 single crystal is highly transmissive with respect to a wide range of wavelengths and incurs little damage from the laser light. Further, a large crystal with excellent quality can be manufactured easily. In addition, this LB4 single crystal is superior with respect to workability, low deliquescence, and excellent ease of handling. In addition, this crystal has a long lifespan.

Accordingly, a small, lightweight, inexpensive optical converting element can be realized using LB4 that can be operated stably over a long period of time, has a long lifespan, and excellent workability.

The conversion efficiency of a wavelength converting element is determined mainly by the inherent physical properties of the crystal, such as its nonlinear optical constant and the tolerance zone for the phase matching angle. An LB4 single crystal has the disadvantage of low conversion efficiency when compared to BBO and CLBO. For this reason, it was felt that an LB4 single crystal with its low conversion efficiency was not suitable for use as a wavelength converting element for radiating light in the ultraviolet region.

In order to improve the low conversion efficiency and obtain radiated light of a high average output, a variety of technical methods can be employed. Conventionally employed methods include, for example, increasing the peak power density of the incident light by using a lens to converge the incident light; increasing the crystal length; using a plurality of wavelength converting crystals; and employing as the light source a laser oscillator that has high quality beam characteristics, i.e., little beam spreading at high outputs.

However, improving the conversion efficiency using these types of technical methods has had the following limitations.

First, in the method for increasing the peak power density of the incident light by converging the incident light with a lens, the peak power density cannot be increased limitlessly; rather, consideration must be given to laser damage from the incident light.

In other words, an antireflection film to reduce reflection is typically coated onto the end face of the crystal element in the wavelength converting element. However, in general, this antireflection film's resistance to damage by the laser is not all that sufficient, so that damage can be incurred if the peak power density of the incident light is high. In addition, when the light is input at a high peak power density, it is possible for the crystal element itself to suffer dielectric breakdown. Accordingly, the wavelength converting element's laser damage threshold, including the characteristics of the antireflection film, must be taken into consideration, and appropriate limits then applied to the peak power density of the incident light.

In addition, even in the case where high conversion efficiency is obtained by increasing the peak power density of the incident light, nonlinear optical crystals have the unique problem of two photon absorption. This is a phenomenon whereby, as a result of two photon absorption by the crystal itself, a donut-shaped hole opens up in the center of the radiated light beam pattern, leading to extremely unstable output. Two photon absorption can strengthen in proportion to the square of the beam intensity of the radiated light. Thus, heating within the crystal from absorption can have a large effect, particularly at the high intensity beam center, causing the refractive index to vary and disrupting phase matching.

Note that for the purpose of protecting nonlinear crystals from moisture, or to perform phase matching using temperature, it has been the conventional practice to heat and maintain nonlinear optical crystals at 40–200° C.

When a lens is used to converge incident light, spreading of the incident beam increases. As a result, the tolerance zone for the phase matching angle is exceeded, and conversion efficiency decreases.

In the case of the method in which crystal length is increased, the tolerance zone for the phase matching angle narrows and absorption by the crystal increases when the crystal is made longer. Once a specific length has been exceeded, there is a tendency for the conversion efficiency to gradually become saturated. In addition, strain arises in the beam pattern from walk-off when the crystal becomes longer. Thus, this crystal lengthening approach, as well, cannot be deemed entirely effective.

In the method employing a plurality of individual wavelength converting crystals, a beam passes through a crystal without undergoing wavelength conversion is reused by being made to input to the next crystal. In this method, not only does the conversion efficiency increase, but an increased output may be expected from the effects of interference between wavelength converted light generated by the plurality of individual crystals. However, when there is broad spreading of the incident light beam, or when the beam diameter is small in this method, it is not possible to obtain a sufficient interference effect.

In the case of the method in which a laser oscillator having high quality beam characteristics is employed as the light source, use of a beam that experiences little spreading at high power is certainly ideal from the perspective of increasing conversion efficiency. However, it is difficult to make this type of oscillator at low cost.

Further, as an additional problem, as explained above, while use of various nonlinear optical crystals as converting elements is known, a method has not yet been achieved that enables second harmonic waves and other such high power sum frequency waves to be obtained with good efficiency.

In other words, in order to obtain high power sum frequency waves like second harmonic waves, it is first necessary to employ a converting element that can achieve a high conversion efficiency. Secondly, in order to enable conversion of high power incident light, it is necessary to use a converting element that possesses high resistance to damage from the incident light.

However, it is generally the case that nonlinear optical crystals that have high conversion efficiency have poor resistance to damage, while nonlinear optical crystals that are highly resistant to damage have poor conversion efficiency. Thus, a nonlinear crystal equipped with both sufficient conversion efficiency and resistance to damage has not been available.

The present invention was conceived in view of the above-described problems and is directed to the provision of an optical wavelength converting method, and to an optical wavelength converting system, program and medium, which enable production of an all solid state ultraviolet laser oscillator that stably achieves a high conversion efficiency using a nonlinear optical crystal, lithium tetraborate single crystal LB4 for example, and is durable with respect to practical applications (first problem).

The present invention is further directed to the provision of an optical wavelength converting method, an optical wavelength converting system, and a laser oscillating system that compensate for the restrictive conditions of the nonlinear optical crystals that can be employed and are capable of obtaining high power sum frequency waves such as second harmonic waves with good efficiency (second problem).

DISCLOSURE OF INVENTION

In order to resolve the above-described first problem, the present invention provides an optical wavelength converting method in which light of a prescribed repetition frequency from a laser oscillator that oscillates coherent light of an inherent wavelength $\lambda$ is employed as incident light, and is made to input to a nonlinear optical crystal having a prescribed crystal length, and light having a wavelength of ½λ is radiated, wherein the wavelength of the incident light is 1000 nm or less, and the peak power density of the incident light is 0.1–10 fold greater than the peak power density that provides the maximum conversion efficiency.

Further, the present invention provides an optical wavelength converting method in which light of a prescribed repetition frequency from a laser oscillator that oscillates coherent light of an inherent wavelength λ is employed as incident light and is made to input to a lithium tetraborate ($Li_2B_4O_7$) single crystal having a prescribed crystal length, and light having a wavelength of ½λ is radiated; wherein the wavelength of the incident light is 1000 nm or less, and the peak power density of the incident light is 0.1–10 fold greater than the optimal peak power density Pc obtained by the following formula (1)

$$Pc = \alpha \cdot Rep^\beta \quad (1)$$

(Where: Rep=repetition frequency, and α and β are constants.)

The present invention further provides an optical wavelength converting system comprising: a laser oscillator for oscillating coherent light having an inherent wavelength λ, and a nonlinear optical crystal of a prescribed crystal length in which light of a prescribed repetition frequency from the laser oscillator is employed as incident light, and light having a wavelength of ½λ is radiated, wherein the wavelength of the incident light is 1000 nm or less, and the peak power density of the incident light is 0.1–10 fold greater than the peak power density that provides the maximum conversion efficiency.

In addition, the present invention provides an optical wavelength converting system that is provided with a laser oscillator for oscillating coherent light of an inherent wavelength λ, and a lithium tetraborate ($Li_2B_4O_7$) single crystal of a prescribed crystal length in which light of a prescribed repetition frequency from the laser oscillator is employed as incident light, and light having a wavelength of ½λ is radiated; wherein the wavelength of the incident light is 1000 nm or less, and the peak power density of the incident light is 0.1~10 fold greater than the optimal peak power density Pc obtained by the following Formula (1).

$$Pc = \alpha \cdot Rep^\beta \quad (1)$$

(Where: Rep=repetition frequency, and α and β are constants.)

The peak power density of the incident light in the each of the respective inventions as described above is 0.1–10 fold, preferably 0.1–5 fold, and even more preferably 0.5–2 fold greater than the peak power density that provides the maximum conversion efficiency.

The wavelength of the incident light in the respective inventions as described above is 1000 nm or less. However, a preferable range is 400–800 nm, a more preferable range is 400–600 nm, an even more preferable range is 400–550 nm, and the most preferable range is 480–540 nm.

It is desirable that beam spreading of the incident light in the respective inventions as described above is 10 m rad or less, and more preferably is in the range of 0.3–4 m rad.

It is preferable that the time pulse width is 100 n sec or less, with $1 \times 10^{-3}$–80 n sec range being more preferable.

It is desirable that the peak power density be 1 MW/cm² or greater.

In addition, the present invention provides a program for activating a computer comprising: an input section for receiving a data group comprising the peak power density and conversion efficiency of incident light when radiated light of wavelength of ½λ is obtained by causing incident light of a prescribed repetition frequency and wavelength λ to input to a nonlinear optical crystal; a memory section in which a plurality of the data groups is stored; a calculating section for calculating the peak power density at which the maximum conversion efficiency is obtained using the plurality of data groups stored in the memory section; and an output section for outputting the peak power density at which the maximum conversion efficiency can be obtained that is calculated by the calculating section.

The present invention further provides a program for activating a computer comprising: an input section for receiving preset values comprising the repetition frequency Rep and constants α and β when obtaining radiated light of wavelength ½λ by causing light of wavelength λ to input to a nonlinear optical crystal; a calculating section for calculating the optimal peak power density based on the following Formula (1) using the preset values input into the input section; and an output section for outputting the optimal peak power density obtained by the calculating section.

$$Pc = \alpha \cdot Rep^\beta \quad (1)$$

(Where: Rep=repetition frequency, and α and β are constants.)

The present invention also provides a computer readable medium for holding a program which activates a computer comprising an input section for receiving a data group comprising the peak power density and conversion efficiency of incident light when radiated light of wavelength of ½λ is obtained by causing incident light of a prescribed repetition frequency and wavelength λ to input to a nonlinear optical crystal; a memory section for storing a plurality of the data groups; a calculating section for calculating the peak power density at which the maximum conversion efficiency is obtained using the plurality of data groups stored in the memory section; and an output section for outputting the peak power density at which the maximum conversion efficiency can be obtained that is calculated by the calculating section.

The present invention also provides a computer readable medium for holding a program which activates a computer comprising: an input section for receiving preset values comprising the repetition frequency Rep and constants α and β when radiated light of wavelength of ½λ is obtained by causing incident light of wavelength λ to input to a nonlinear optical crystal; a calculating section for calculating the optimal peak power density based on the following Formula (1) using the preset values input into the input section; and an output section for outputting the optimal peak power density obtained by the calculating section.

$$Pc = \alpha \cdot Rep^\beta \quad (1)$$

(Where: Rep=repetition frequency, and α and β are constants.)

Note that a variety of media, such as hard disk, flexible disk, CD-ROM, semiconductor memory, DVD, etc., may be employed as the computer readable medium employed in this invention.

In order to resolve the above-described first problem, the present invention provides an optical wavelength converting method which employs light from a laser oscillator that oscillates coherent light of inherent wavelength λ as incident light, inputs the light to a nonlinear optical crystal and radiates out light of wavelength ½λ, wherein the nonlinear optical crystal is heated to and maintained at 200–600° C.

The present invention further provides an optical wavelength converting system comprising: a laser oscillator that oscillates coherent light of inherent wavelength $\lambda$; a nonlinear optical crystal in which light from the laser oscillator is employed as incident light, and light of wavelength $\frac{1}{2}\lambda$ is radiated; and a heating section that heats and maintains the nonlinear optical crystal at 200–600° C.

In the respective inventions as described above, it is even more desirable that the heating and maintaining temperature is in the range of 200–400° C.

The desirable range for the wavelength of the incident light in the respective inventions described above is 1000 nm or less, but preferably 400–800 nm, more preferably 400–600 nm, and most preferably 480–540 nm.

It is desirable that beam spreading of the incident light in the respective inventions described above be 10 m rad or less, and more preferably 0.3–4 m rad.

It is preferable that the time pulse width is 100 n sec or less, and more preferably in the range of $1\times10^{-3}$ –80 n sec.

It is desirable that the peak power density be 1 MW/cm$^2$ or greater.

In order to resolve the aforementioned first problem, the present invention provides an optical wavelength converting method in which light from a laser oscillator, that oscillates coherent light of inherent wavelength $\lambda$ as incident light, is input to a lithium tetraborate (Li$_2$B$_4$O$_7$) single crystal, and light of wavelength $\frac{1}{2}\lambda$ is radiated; wherein the lithium tetraborate (Li$_2$B$_4$O$_7$) single crystal is heated to and maintained at 50–600° C.

The present invention further provides an optical wavelength converting system comprising: a laser oscillator that oscillates coherent light of an inherent wavelength $\lambda$; a lithium tetraborate (Li$_2$B$_4$O$_7$) single crystal that employs light from the laser oscillator as incident light and radiates light of wavelength $\frac{1}{2}\lambda$; and a heating section that heats and maintains the lithium tetraborate single crystal at 50–600° C.

In the respective inventions, it is even more desirable that the heating and maintaining temperature is in the range of 100–400° C.

The desirable range for the wavelength of the incident light in the respective inventions described above is 1000 nm or less, but preferably 400–800 nm, more preferably 400–600 nm, and most preferably 480–540 nm.

Further, in the respective inventions described above, beam spreading of the incident light is 10 m rad or less, and more preferably 0.3–4 m rad.

It is preferable that the time pulse width is 100 n sec or less, and more preferably $1\times10^{-3}$–80 n sec.

It is desirable that the peak power density be 1 MW/cm$^2$ or greater.

In order to resolve the above-described second problem, the present invention provides an optical wavelength converting method in which fundamental waves of a prescribed wavelength and time pulse width are input to a first nonlinear optical crystal and a second nonlinear optical crystal sequentially, and the second harmonic of the fundamental waves is generated, wherein the bulk damage threshold of the first nonlinear optical crystal with respect to the fundamental wave is larger than that of the second nonlinear optical crystal, and the effective nonlinear constant of the second nonlinear crystal with respect to the fundamental waves is larger than that of the first nonlinear optical crystal.

The present invention further provides an optical wavelength converting method in which fundamental waves of a prescribed wavelength and time pulse width and the second harmonic wave of the fundamental waves are input to a first nonlinear optical crystal and a second nonlinear optical crystal sequentially, and the third harmonic of the fundamental waves is generated, wherein the bulk damage threshold of the first nonlinear optical crystal with respect to the second harmonic wave is larger than that of the second nonlinear optical crystal, and the effective nonlinear constant of the second nonlinear optical crystal with respect to the third harmonic generation of the fundamental wave is larger than that of the first nonlinear optical crystal.

The present invention provides an optical wavelength converting method in which a first fundamental wave of a prescribed wavelength and time pulse width and a second fundamental wave of a prescribed wavelength and time pulse width are input to a first nonlinear optical crystal and a second nonlinear optical crystal sequentially, and the sum frequency wave of the first fundamental wave and the second fundamental wave are generated, wherein the bulk damage threshold of the first nonlinear optical crystal with respect to the first fundamental wave is larger than that of the second nonlinear optical crystal, and the effective nonlinear constant of the second nonlinear optical crystal with respect to the sum frequency wave generation from the first fundamental wave and the second fundamental wave is larger than that of the first nonlinear optical crystal.

The present invention further provides a optical wavelength converting system comprising: a first nonlinear optical crystal to which a fundamental wave of a prescribed wavelength and time pulse width is input and a second harmonic wave is generated, and a second nonlinear optical crystal to which radiated light from the first nonlinear optical crystal is input and a second harmonic wave of the fundamental wave is generated, wherein the bulk damage threshold of the first nonlinear optical crystal with respect to the fundamental wave is larger than that of the second nonlinear optical crystal, and the effective nonlinear constant of the second nonlinear optical crystal with respect to the second harmonic wave generation of the fundamental wave is larger than that of the first nonlinear optical crystal.

The present invention further provides an optical wavelength converting system comprising: a first nonlinear optical crystal to which a fundamental wave of a prescribed wavelength and time pulse width and the second harmonic of the fundamental wave are input, and a third harmonic wave is generated; and a second nonlinear optical crystal to which radiated light from the first nonlinear optical crystal is input and the third harmonic wave is generated; wherein the bulk loss threshold of the first nonlinear optical crystal with respect to the second harmonic wave is larger than that of the second linear optical crystal, and the effective nonlinear constant of the second nonlinear optical crystal with respect to the third harmonic wave generation of the fundamental wave is larger than that of the first linear optical crystal.

The present invention further provides an optical wavelength converting system comprising: a first nonlinear optical crystal to which a fundamental wave of a prescribed wavelength and time pulse width and the second harmonic of the fundamental wave are input, and a third harmonic wave is generated; and a second nonlinear optical crystal to which radiated light from the first nonlinear optical crystal is input and the third harmonic wave is generated; wherein the bulk loss threshold of the first nonlinear optical crystal with respect to the second harmonic wave is larger than that of the second nonlinear optical crystal, and the effective nonlinear constant of the second nonlinear optical crystal with respect to the third harmonic wave generation of the fundamental wave is larger than that of the first nonlinear optical crystal.

The present invention provides a laser oscillating system comprising: a fundamental wave oscillator for oscillating a fundamental wave of a prescribed wavelength and time pulse width; and an optical wavelength converting system to which the fundamental wave from the fundamental wave oscillator is input and a second harmonic wave is generated; wherein the optical wavelength converting system is the optical wavelength converting system according to the present invention.

The present invention provides a laser oscillating system comprising: a fundamental wave oscillator for oscillating a fundamental wave of a prescribed wavelength and time pulse width and the second harmonic of this fundamental wave; and an optical wavelength converting system to which the fundamental wave and the second harmonic wave from the fundamental wave oscillator are input, and a third harmonic wave is generated; wherein the optical wavelength converting system is the optical wavelength converting system according to the present invention.

The present invention provides a laser oscillating system comprising: a fundamental wave oscillator for oscillating a first fundamental wave of a prescribed wavelength and time pulse width and a second fundamental wave of a prescribed wavelength and time pulse width; and an optical wavelength converting system to which the first fundamental wave and the second fundamental wave from the fundamental wave oscillator are input and a sum frequency wave is generated, wherein the optical wavelength converting system is the optical wavelength converting system according to the present invention.

In the respective inventions described above, even if the conversion efficiency of the first nonlinear optical crystal is low, fundamental waves, etc., that have passed through can be converted with high efficiency by the second nonlinear optical crystal. In addition, even if the second nonlinear optical crystal has low resistance to light damage, incident light passes through the first nonlinear coefficient which is highly resistance to light damage. As a result, the power to which the second nonlinear optical crystal is subjected is decreased, making it possible to input the light thereto.

In other words, by combining different types of nonlinear optical crystals that have specific relationships to one another, the deficits of the different crystals are mutually compensated, so that a high conversion efficiency and high resistance to light damage can be achieved. Accordingly, high power sum frequency waves such as the second harmonic wave can be obtained with good efficiency.

It is desirable that the first nonlinear optical crystal in the respective inventions described above be a lithium tetraborate ($Li_2B_4O_7$) single crystal. This is because, although the conversion efficiency of LB4 ($Li_2B_4O_7$) is relatively low, it has an extremely excellent resistance to damage from light.

When LB4 is employed as the first nonlinear optical crystal, it is desirable that the second nonlinear optical crystal be $LiB_3O_5$ (LBO), $CsLiB_6O_{10}$ (CLBO), $KTiOPO_4$ (KTP), or $\beta\text{-}BaB_2O_4$ (BBO).

The technical significance of the present invention will now be explained with reference to experimental results.

The present inventors used experiments to determine the relationship between the peak power density and the conversion efficiency of the incident light for an LB4 crystal, which is a nonlinear optical crystal. These results are shown in FIG. 1. The conditions for the LB4 crystal and the oscillator of the incident light employed in the experiments were as follows:

A combination of an Nd:YAG laser and an LBO crystal, employed as an SHG element, was used for the incident light oscillator. In other words, the light which is input to the LB4 crystal was green laser (532 nm) which is the second harmonic wave of the near infrared light (1064 nm) from the Nd:YAG laser. Note that different oscillators were employed to obtain incident light with a repetition frequency of 5 kHz or greater, and incident light with a repetition frequency of 100 Hz or less.

The peak power density is obtained by dividing the average output of the incident light by the repetition frequency, beam area and time pulse width. Therefore, in these experiments, the average output of the incident light was adjusted by adjusting the power of the excitation light power applied to the YAG laser. In addition, a condensing lens was used to adjust the beam diameter (beam area).

The LB4 crystal employed had a crystal length of either 35 mm or 60 mm. Note that the cross-sectional area of the LB4 crystal does not affect the conversion efficiency, however, in the main, an LB4 crystal of cross-section 15 mm×15 mm was employed.

In FIG. 1, symbol $X_1$ (indicated by ◆) is data for the case of a crystal length of 35 mm, repetition frequency of 1 Hz, and beam diameter of 5.5 mm.

Symbol $X_{10}$ (indicated by ■) is data for the case of a crystal length of 35 mm, repetition frequency of 10 Hz, and beam diameter of 5.5 mm or 11 mm (11 mm for a peak power density of less than 200 MW/cm$^2$; 5.5 mm for a peak power density of 200 MW/cm$^2$ or more:).

Symbol $X_{100}$ (indicated by ▲) indicates data for the case of a crystal length of 35 mm, repetition frequency of 100 Hz, and beam diameter of 5.5 mm or 11 mm (11 mm for a peak power density of less than 100 MW/cm$^2$; 5.5 mm for a peak power density of 100 MW/cm$^2$ or more).

Symbol $Y_{10}$ (indicated by □) indicates data for the case of a crystal length of 60 mm, repetition frequency of 10 Hz, and beam diameter of 11 mm.

Symbol $Y_{100}$ (△) indicates data for the case of a crystal length of 60 mm, repetition frequency of 100 Hz, and beam diameter of 11 mm.

The time pulse width when the above data was obtained was fixed at 3 n sec, and the peak power density was adjusted by varying the average output within the range of 0–26 W. Note that beam spreading was about 1 m rad when the beam diameter was 5.5 mm, and about 0.5 m rad when the beam diameter was 11 mm.

The symbol $Z_5$ (indicated by ●) indicates data in the case of a crystal length of 35 mm and repetition frequency of 5 kHz. When this data was obtained, the time pulse width was fixed at 25 n sec, the average output was fixed at 30 W, and the peak power density was adjusted by varying the beam diameter in the range of 0.4–1.0 mm. Note that beam spreading was around several rad (5 m rad or less).

The symbol $Z_{10}$ (◇) indicates data in the case of a crystal length of 35 mm and repetition of frequency 10 kHz. When this data was obtained, the time pulse width was fixed at 30 n sec, the average output was fixed at 30 W, and the peak power density was adjusted by varying the beam diameter in the range of 0.4–1.0 mm. Note that beam spreading was around several rad (5 m rad or less).

In general, as shown in the following Formula (2), it is known that the more that the peak power P of the incident light increases, the more the conversion efficiency η increases.

$$\eta = a \cdot \tan h^2(b \cdot P^{0.5}) \quad (2)$$

(Where a and b are constants determined mainly according to the crystal type and crystal length.)

As shown in FIG. 1, when light from the same oscillator is input to an LB4 crystal with a crystal length of 35 mm, the data points indicated by $X^1$, $X_{10}$, and $X_{100}$ coincide at incident light peak power densities of 100 MW/cm$^2$ or less, regardless of the repetition frequency. Thus, by examining data only within this range, it is predicted that the curve indicated by symbol $X_0$ can be traced out in accordance with the principle shown in Formula (2) as the peak power density increases. Note that when a and b on the curve indicated by symbol $X_0$ are determined from data in this range, then a=32 and b=0.085.

As shown by data points indicated by $Z_5$, $Z_{10}$, when different oscillators are employed, then, even in the case of the same crystal length of 35 mm, a deviation from curve $X_0$ can be seen over the entire peak power density range. At low peak power densities, however, a rising curve with roughly the same slope as $X_0$ could be obtained. Note that the large amount of beam spreading is thought to be the main cause of the curve deviations.

Similarly, in the case of an LB4 crystal having a crystal length of 60 mm, the data points indicated by $Y_{10}$, $Y_{100}$ coincide at incident light peak power densities of 50 MW/cm$^2$ or less, regardless of the repetition frequency. Thus, by examining data only within this range, it is predicted that the curve indicated by symbol $Y_0$ can be traced out in accordance with the principle shown in Formula (2) even if the peak power density increases. Note that when a and b on the curve indicated by symbol $Y_0$ are determined from data in this range, then a=22 and b=0.18.

However, once the peak power density of the incident light exceeded a set value, then the data points indicated by $X_{10}$, $X_{100}$, $Y_{100}$, $Z_5$ and $Z_{10}$ deviated from the ideal curves $X_0$, $Y_0$ predicted by Formula (2), and a deteriorating conversion efficiency phenomenon was observed in this experiment.

In addition, it also became clear from this data that the higher the repetition frequency, the lower the peak power density at which the conversion efficiency began to decrease.

In addition, another trend seen was that the longer the crystal length, the higher the conversion efficiency became.

As described above, these experiments investigated conversion efficiency while varying the peak power density of the incident light, and examined the stability of the radiated light. As a result, a two photon absorption phenomenon in which the output of radiated light becomes unstable, was discovered at the point where separation from curves $X_0$, $Y_0$ that are in accordance with Formula (2) occurs, this point being exactly where the conversion efficiency starts to decrease. This phenomenon of destabilization of the radiated light was not observed at all prior to the point where the conversion efficiency began to decrease. Moreover, once the conversion efficiency began to decrease, then this phenomenon became more marked as the peak power density was increased further.

In other words, the present inventors discovered that the peak power density that provides the maximum conversion efficiency when the repetition frequency of the laser oscillator and the length of the LB4 crystal are held constant corresponds to "an optimal value for the peak power density of the incident light at which the maximum radiated light output is obtained without essentially giving rise to the so-called two photon absorption phenomenon that leads to destabilization of output" (hereinafter, referred to simply as "optimal peak power density").

Next, based on data $X_1$, $X_{10}$, $X_{100}$ in FIG. 1, a study was made of how the optimal peak power density varies in response to repetition frequency for the case of a crystal length of 35 mm. As shown in FIG. 2, a nearly straight line graph was obtained. The repetition frequency of the incident light is plotted in logarithmic scale along the horizontal axis, and the peak power density of the incident light is plotted in logarithmic scale along the vertical axis in FIG. 2.

The above Formula (1) was used to obtain the straight line equation for this optimal peak power density Pc.

$$Pc = \alpha \cdot Rep^\beta \quad (1)$$

(Where: Rep=repetition frequency, and $\alpha$ and $\beta$ are constants.)

The constants $\alpha$ and $\beta$ are determined mainly according to crystal length and the type of crystal. In the case of the LB4 crystal having a crystal length of 35 mm shown in FIG. 2, $\alpha=576$ and $\beta=-0.27$. For an LB4 crystal having a crystal length of 60 mm, $\alpha=154$ and $\beta=-0.25$.

Note that as shown by data points $Z_5$ and $Z_{10}$, there is an effect on the conversion efficiency with changes in the beam spreading of the incident light. This is because a loss of conversion efficiency occurs when beam spreading of the incident light exceeds the tolerance angle range that is determined based on the phase matching conditions of the LB4 crystal.

However, in this case as well, by correcting the effects of beam spreading, it is possible to determine the optimal peak power density by theoretically evaluating the conversion characteristics. From the experiments it was confirmed that when beam spreading of the incident light exceeds 10 m rad, then conversion efficiency falls to $\frac{1}{10}$ of its value as compared to when beam spreading of the incident light is 1 m rad. Thus, it is difficult to obtain radiated light of a level that can be practically employed.

Thus, it is most desirable that the optimal peak power density be employed for the peak power density of the incident light. However, from a practical perspective, it is possible to employ a set range of peak power densities, with the optimal peak power density taken as the standard.

In other words, it is desirable to set the peak power density of the incident light to be equal to or less than the optimal peak power density. This is because when the peak power density is greater than the optimal peak power density, the output of the radiated light becomes unstable. However, two photon absorption becomes gradually more marked once the optimal peak power is exceeded, rather than having a large effect immediately. Thus, if the peak power density of the incident light is made to be 10-fold or less than the optimal peak power density, no hindrance to practical application is incurred. Further, if the peak power density of the incident light is made to be two-fold or less than the optimal peak power density, then it is even more possible to control output destabilization.

In order to obtain the highest radiated light power possible with good efficiency, it is necessary to set the peak power density to 0.1 fold or more than the optimal peak power density, with 0.5 fold or greater being desirable.

Note that if consideration is given to the lifespan of a nonlinear crystal, it is desirable to set the incident light peak power density to be 0.8 fold or less than the optimal peak power density. Accordingly, the most desirable peak power density for the incident light is in the range of 0.5–0.8 fold greater than the optimal peak power density.

In addition, taking the optimal peak power density as a boundary, the phenomenon in which conversion efficiency decreases and output becomes unstable is observed most remarkably as the wavelength becomes shorter, and in particular when converting from so-called green light to ultraviolet light. Accordingly, the present invention is particularly effective at incident light wavelengths of 1000 nm or less, with incident light wavelengths in the range of 400–800 nm being desirable, and in the range of 400–600 nm being even more desirable.

As a result of further investigations by the present inventors, it was discovered that this optimal peak power density could be increased by heating and maintaining the nonlinear optical crystal to 50° C. or higher. As discussed above, it has been the conventional practice to heat and maintain nonlinear optical crystals for the purpose of protecting them from moisture, or to carry out phase matching using temperature. In these cases, however, the degree of heating was around less than 200° C. In other words, heating and maintaining to temperatures of 200° C. or higher as in the present invention was not performed.

The effects of heating to a relatively high temperature as in the present invention will be explained using Table 1 and FIG. 3, and Table 2 and FIG. 4.

Conversion efficiency was examined for the case where the incident light's average repetition frequency, beam diameter and time pulse width were fixed at 10 kHz, 0.25 mm and 28 n sec, respectively, and only the average output of the incident light was varied. These results are shown in Table 1. FIG. 3 is a graph obtained from the data in Table 1 by plotting the average output of the incident light on the horizontal axis and the conversion efficiency on the vertical axis.

Similarly, the conversion efficiency was examined for the case where the incident light's average repetition frequency, beam diameter and time pulse width were fixed at 10 kHz, 0.35 mm and 28 n sec, respectively, and only the average output of the incident light was varied. These results are shown in Table 2. FIG. 4 is a graph obtained from the data in Table 1 by plotting the average output of the incident light on the horizontal axis and the conversion efficiency on the vertical axis.

Note that the average output of the incident light is in proportion to the peak power density of the incident light as shown in Table 2. In addition, the temperature (Temp) in the tables and figures is the heating and maintaining temperature of LB4 (RT is room temperature, approximately 25° C.).

TABLE 1

| | Temp: RT | | Temp: 60° C. | | Temp: 100° C. | | Temp: 150° C. | | Temp: 200° C. | |
|---|---|---|---|---|---|---|---|---|---|---|
| Incident light [W] | Radiated light [W] | Conversion efficiency [%] | Radiated light [W] | Conversion efficiency [%] | Radiated light [W] | Conversion efficiency [%] | Radiated light [W] | Conversion efficiency [%] | Radiated light [W] | Conversion efficiency [%] |
| 5.51 | 0.09 | 1.63 | 0.12 | 2.18 | 0.13 | 2.36 | 0.15 | 2.72 | 0.15 | 2.72 |
| 6.69 | 0.16 | 2.39 | | | | | | | | |
| 7.92 | 0.25 | 3.16 | 0.29 | 3.66 | 0.32 | 4.04 | 0.33 | 4.17 | 0.33 | 4.17 |
| 9.16 | 0.36 | 3.93 | | | | | | | | |
| 10.41 | 0.46 | 4.42 | 0.53 | 5.09 | 0.57 | 5.48 | 0.6 | 5.77 | 0.63 | 6.05 |
| 11.64 | 0.54 | 4.64 | 0.66 | 5.67 | 0.72 | 6.18 | 0.76 | 6.53 | 0.78 | 6.70 |
| 12.85 | 0.73 | 5.68 | 0.83 | 6.46 | 0.87 | 6.77 | 0.92 | 7.16 | 1 | 7.78 |
| 14.03 | 0.9 | 6.42 | 0.99 | 7.06 | 1.06 | 7.56 | 1.13 | 8.06 | 1.2 | 8.55 |
| 15.16 | 0.81 | 5.35 | 1.16 | 7.65 | 1.26 | 8.31 | 1.32 | 8.71 | 1.43 | 9.43 |
| 16.25 | 0.66 | 4.06 | 1.33 | 8.18 | 1.42 | 8.74 | 1.52 | 9.35 | 1.6 | 9.85 |
| 17.30 | | | 1.5 | 8.67 | 1.6 | 9.25 | 1.71 | 9.89 | 1.85 | 10.70 |
| 18.30 | | | 1.22 | 6.67 | 1.82 | 9.94 | 2 | 10.93 | 2.17 | 11.86 |
| 19.28 | | | | | 1.99 | 10.32 | 2.3 | 11.93 | 2.37 | 12.29 |
| 20.25 | | | | | | | | | 2.54 | 12.54 |
| 21.23 | | | | | | | | | 2.74 | 12.91 |
| 22.25 | | | | | | | | | 3.05 | 13.71 |

TABLE 2

| Incident Light | | | | | | | | | | | |
|---|---|---|---|---|---|---|---|---|---|---|---|
| | | Temp: RT | | Temp: 100° C. | | Temp: 200° C. | | Temp: 300° C. | | Temp: 385° C. | |
| Average output [W] | Peak power density [MW/cm²] | Radiated light [W] | Conversion efficiency [%] | Radiated light [W] | Conversion efficiency [%] | Radiated light [W] | Conversion efficiency [%] | Radiated light [W] | Conversion efficiency [%] | Radiated light [W] | Conversion efficiency [%] |
| 3.7 | 13.2 | 0.06 | 1.63 | 0.06 | 1.63 | 0.08 | 2.18 | 0.09 | 2.45 | 0.08 | 2.18 |
| 4.9 | 17.6 | | | | | | | | | | |
| 6.1 | 21.9 | 0.16 | 2.62 | 0.18 | 2.95 | 0.20 | 3.28 | 0.22 | 3.61 | 0.21 | 3.44 |
| 7.5 | 26.9 | | | | | | | | | | |
| 8.7 | 31.0 | 0.33 | 3.82 | 0.36 | 4.16 | 0.39 | 4.51 | 0.45 | 5.20 | 0.45 | 5.20 |
| 9.9 | 35.5 | | | | | | | | | | |
| 10.8 | 38.5 | 0.51 | 4.74 | 0.56 | 5.21 | 0.61 | 5.67 | 0.67 | 6.23 | 0.70 | 6.51 |
| 11.8 | 42.1 | 0.62 | 5.28 | 0.67 | 5.70 | 0.74 | 6.30 | 0.81 | 6.89 | 0.84 | 7.15 |
| 12.9 | 46.0 | 0.73 | 5.68 | 0.81 | 6.30 | 0.90 | 7.00 | 1.00 | 7.78 | 1.03 | 8.02 |
| 13.9 | 49.8 | 0.81 | 5.83 | 0.95 | 6.83 | 1.09 | 7.84 | 1.18 | 8.49 | 1.23 | 8.85 |
| 14.9 | 53.2 | 0.92 | 6.20 | 1.09 | 7.34 | 1.22 | 8.22 | 1.36 | 9.16 | 1.40 | 9.43 |
| 15.8 | 56.6 | 1.11 | 7.03 | 1.30 | 8.23 | 1.45 | 9.18 | 1.59 | 10.06 | 1.67 | 10.57 |
| 16.5 | 59.1 | 0.87 | 5.27 | 1.46 | 8.85 | 1.67 | 10.12 | 1.79 | 10.85 | 1.91 | 11.58 |

TABLE 2-continued

| Incident Light | | Temp: RT | | Temp: 100° C. | | Temp: 200° C. | | Temp: 300° C. | | Temp: 385° C. | |
|---|---|---|---|---|---|---|---|---|---|---|---|
| Average output [W] | Peak power density [MW/cm$^2$] | Radiated light [W] | Conversion efficiency [%] | Radiated light [W] | Conversion efficiency [%] | Radiated light [W] | Conversion efficiency [%] | Radiated light [W] | Conversion efficiency [%] | Radiated light [W] | Conversion efficiency [%] |
| 17.1 | 61.3 | | | 1.54 | 9.01 | 1.77 | 10.35 | 1.94 | 11.35 | 2.04 | 11.93 |
| 17.8 | 63.8 | | | 1.66 | 9.33 | 1.91 | 10.73 | 2.05 | 11.52 | 2.18 | 12.25 |
| 18.8 | 67.4 | | | 1.88 | 10.00 | 2.14 | 11.38 | 2.36 | 12.55 | 2.50 | 13.30 |
| 19.8 | 70.8 | | | | | 2.45 | 12.41 | 2.70 | 13.67 | 2.83 | 14.33 |

As is clear from Table 1 and FIG. 3, at room temperature, the peak power density reaches an optimal value at an incident light output of approximately 14 W. In contrast, in LB4 that is heated to and maintained at 60° C., the peak power density reaches an optimal value at an incident light output of around 17 W. Further, it may be understood from this data that as the heating and maintenance temperature is further increased, the optimal peak power density continues to rise and a local maximum value for the conversion efficiency within the measured range is not observed.

As is clear from Table 2 and FIG. 4, at room temperature, the peak power density reaches its optimal value (of approximately 57 MW/cm$^2$) at an incident light output of approximately 16 W. In contrast, in the case of LB4 that is heated to and maintained at 100° C. or more, the optimal peak power density increases further without observing a local maximum value for the conversion efficiency within the measured range. Moreover, the higher the heating and maintaining temperature for LB4 becomes, the more the conversion efficiency increases.

In this way, not only does heating reduce the impact of heat release due to two photon absorption, which causes change in the refractive index, but it also increases the optimal peak power density. In other words, it was discovered that the peak power density of the incident light at which output could be stably obtained could be increased, without substantially causing the phenomenon of output destabilization from two photon absorption.

The higher the heating and maintenance temperature, the greater the effects obtained. However, a temperature 200° C. or more is required. As a result, it is possible to reduce the impact of two photon absorption, and eliminate the decrease in conversion efficiency, while removing the phenomenon of a decreasing conversion efficiency and enabling provision of a high output stably.

On the other hand, it is not desirable to increase the heating and maintenance temperature to greater than 600° C. When the temperature exceeds 600° C., the heat insulating section for preventing outflow of heat around the heating section becomes too large and impractical from the standpoint of practical use.

Furthermore, it is desirable that the heating and maintenance temperature be 400° C. or less. This is because temperatures above 400° C. yield little improvement in the effect of diminishing the impact of two photon absorption, so that only a small benefit is conferred from these higher temperatures.

Note that conversion efficiency decreases when beam spreading of the incident light exceeds the tolerance angle zone that is determined based on the phase matching conditions for the LB4 crystal. Accordingly, desirable beam spreading for the incident light is 10 m rad or less, and more desirably in the range of 0.3–4 m rads.

It is also preferable that the time pulse width be 100 n sec or less, and more preferably in the range of $1 \times 10^{-3}$–80 n sec.

In general, the higher the repetition frequency, the more the pulse width broadens and the smaller the pulse energy becomes. Conversely, at lower repetition frequencies, the pulse width can be narrowed and the pulse energy increased. For this reason, an upper limit is determined for the range in which the desired peak density can be obtained.

Further, it is desirable that the peak power density of the incident light be 1 MW/cm$^2$ or more. Note that the upper limit for the peak power density of the incident light is that at which bulk damage to the crystal (dielectric breakdown), or damage to the coating film or the end faces of the crystal, does not occur.

BEST MODE FOR CARRYING OUT THE INVENTION

Preferred embodiments of the present invention will now be explained with reference to the figures. Note, however, that the present invention is not limited thereto.

Figure 1:
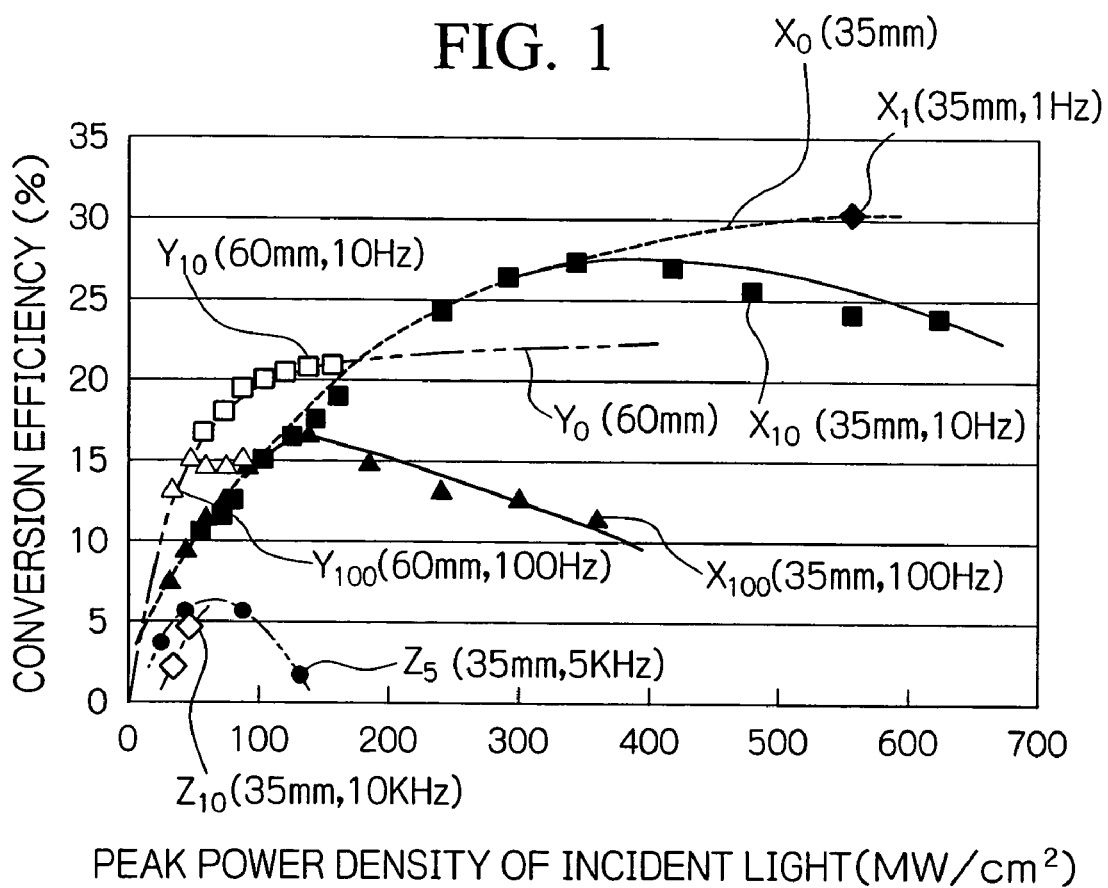
FIG. 1 is a graph showing the relationship between the peak power density of the incident light and conversion efficiency.
Figure 2:
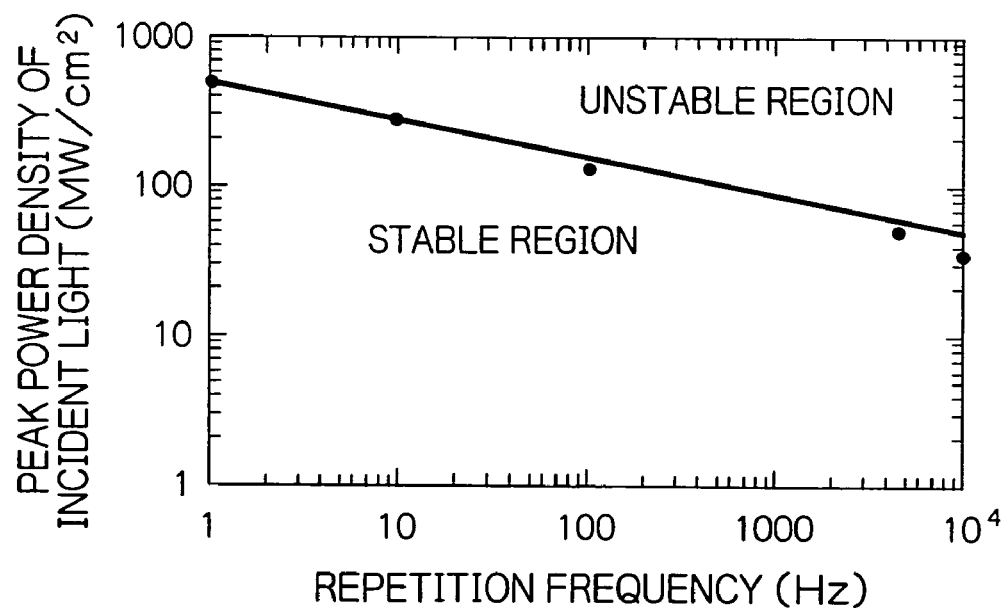
FIG. 2 is a graph examining how the optimal peak power density changes in response to repetition frequency.
Figure 3:
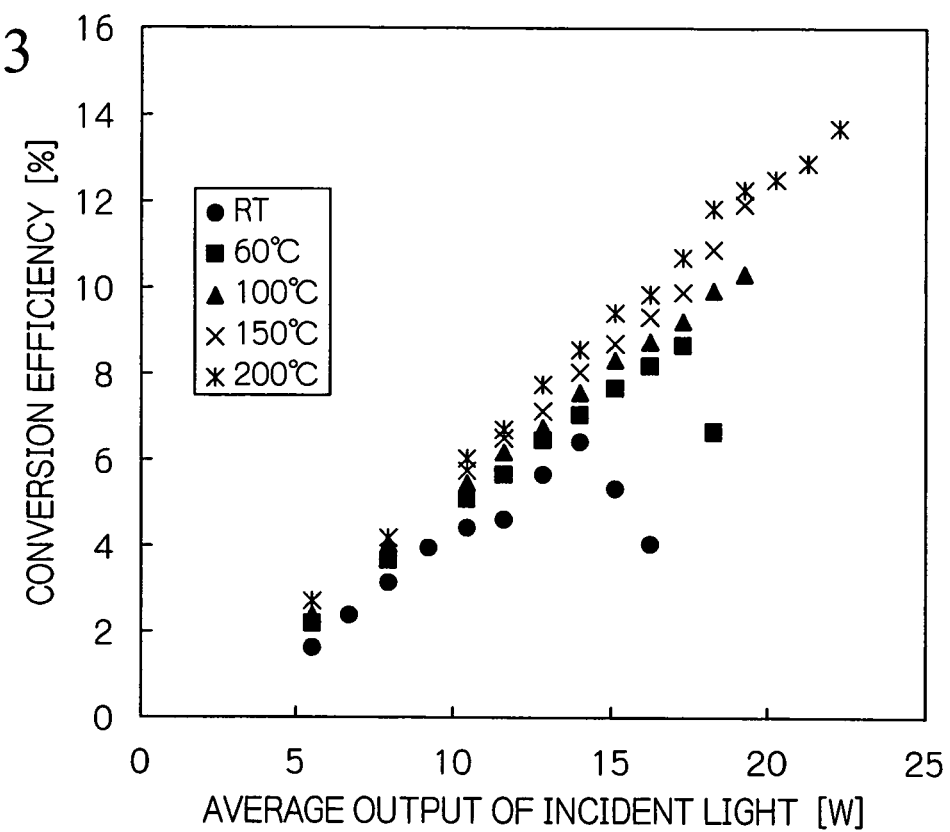
FIG. 3 is a graph showing the results of an examination of the relationship between conversion efficiency and average output of the incident light in response to the heating temperature of the LB4 crystal.
Figure 4:
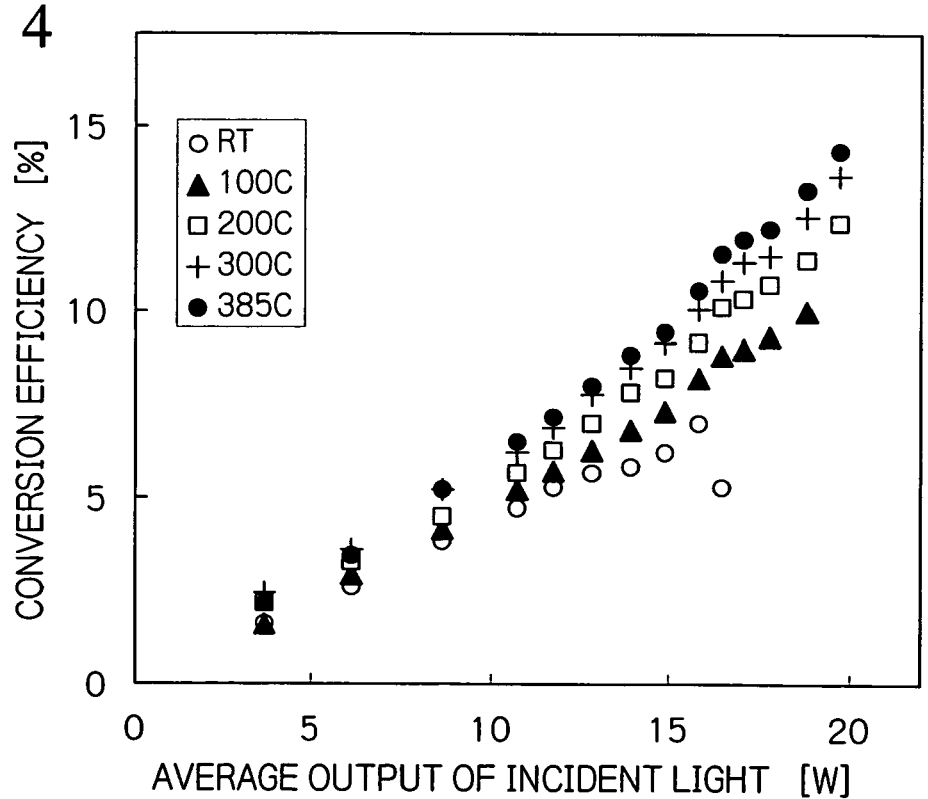
FIG. 4 is a graph showing the results of an examination of the relationship between conversion efficiency and average output of the incident light in response to the heating temperature of the LB4 crystal.
Figure 5:
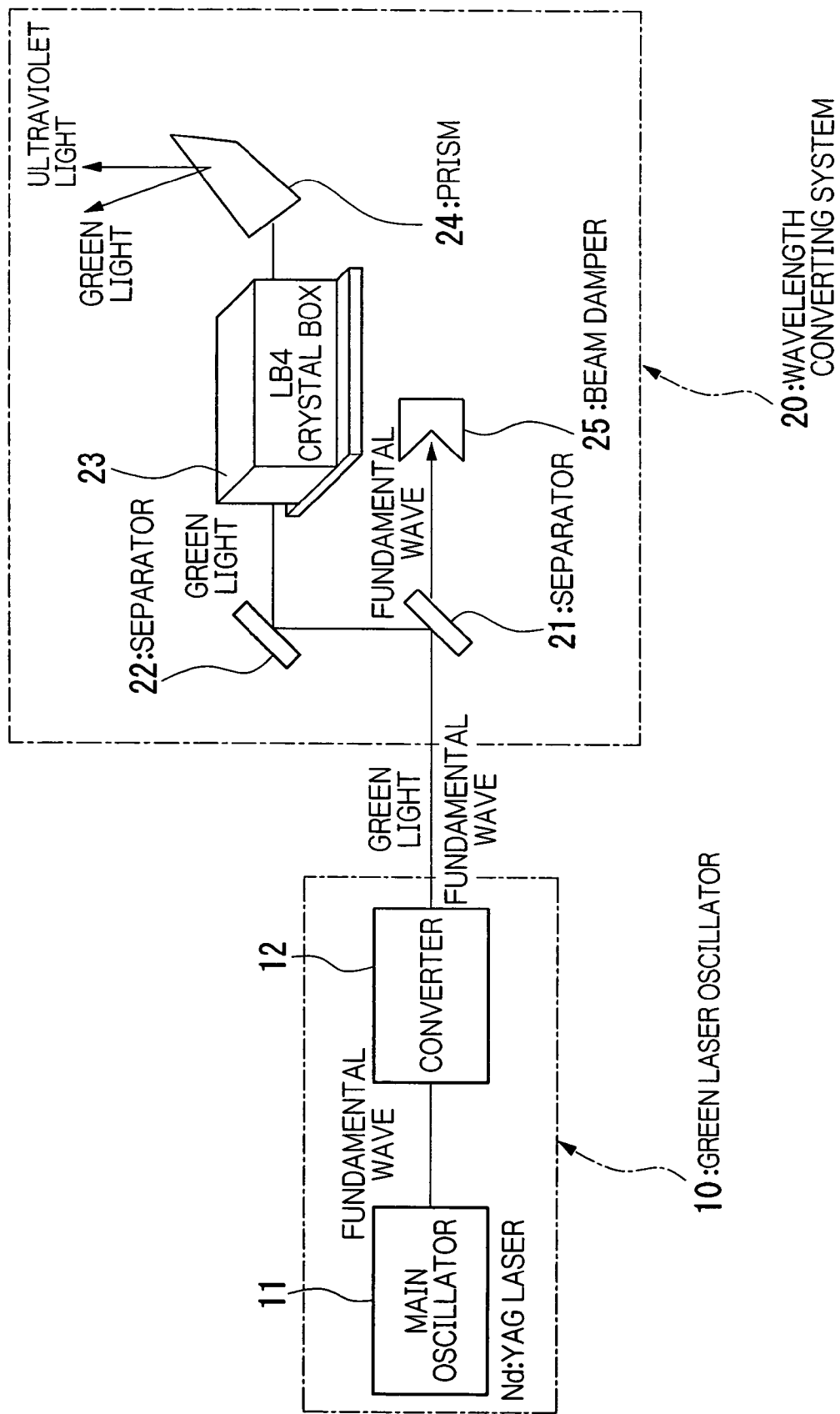
FIG. 5 is a structural view showing a first embodiment of the ultraviolet laser oscillator employing the optical wavelength converting method according to the present invention.

FIG. 5 is a structural view showing an embodiment of the ultraviolet laser oscillator employing the optical wavelength converting method according to the present invention. The ultraviolet laser oscillator shown in FIG. 5 is composed of a green laser oscillator 10 and a wavelength converting system 20.

Green laser oscillator 10 is composed of a main oscillator 11 comprising an Nd:YAG laser, and a converter 12 that converts the fundamental wave (1064 nm) output from main oscillator 11 into second harmonic waves, that is, green light (532 nm).

Wavelength converting system 20 is composed of separators 21 and 22 for separating the green light radiated from converter 12 from fundamental waves that have passed through converter 12 without being wavelength converted; an LB4 crystal box 23 to which the green light separated by separators 21 and 22 is input as the incident light; prism 24 which separates the radiated light outgoing from LB4 crystal box 23; and beam damper 25 for absorbing the fundamental waves separated by separator 21.

A lithium tetraborate single crystal LB4 is disposed inside LB4 crystal box 23 in a manner so as to satisfy the phase matching angle. Further, a heating device is also housed inside LB4 crystal box 23 for heating and maintaining the temperature of this LB4 crystal at 600±1° C.

In the ultraviolet laser oscillator according to the present embodiment, green light is converted by LB4 crystal box 23 into ultraviolet light (266 nm), which is the second harmonic waves of the green light and the fourth harmonic waves of the fundamental wave. Further, using prism 24, it is possible to extract only the wavelength converted ultraviolet light.

The optimal peak power density of LB4 crystal box 23 attains a higher value than if it is employed at room temperature without heating. The peak power density of the green light that is input to LB4 crystal box 23 from separator 22 is 0.5–2 times greater than this optimal peak power density.

The present embodiment employs incident light that increases the optimal peak power density, and that has a peak power density that is less than or equal to but approaching this optimal peak power density. For this reason, even if the peak power density of the incident light is increased, it is possible to obtain a stable output. Accordingly, high conversion efficiency can be stably reached using a lithium tetraborate single crystal LB4, to achieve an all solid state ultraviolet laser oscillator that is durable with respect to practical application.

Figure 6:
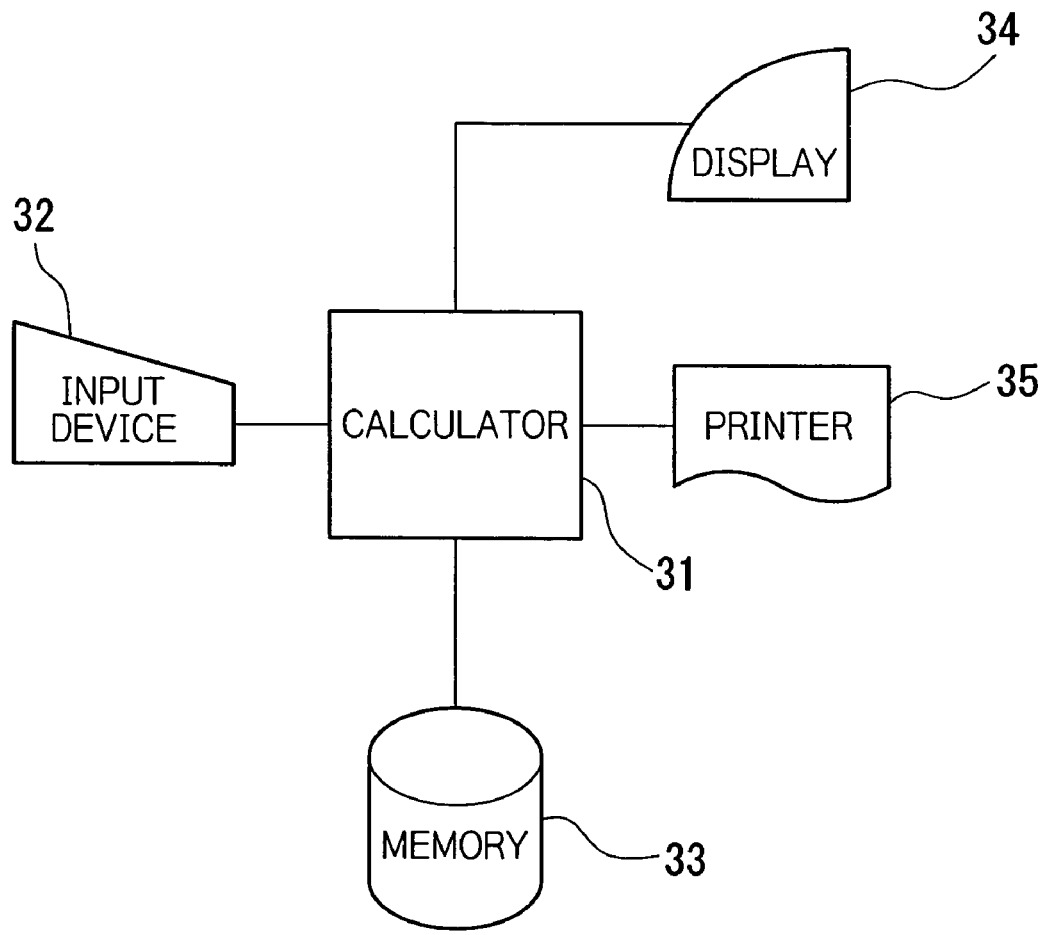
FIG. 6 is a structural view of an example of the computer system that activates functions according to the program of the present invention.

FIG. 6 is a structural view of an embodiment of the computer system for achieving functions according to the program of the present invention. In FIG. 6, reference symbol 31 is a calculator, 32 is an input device, 33 is a memory for storing data input from input device 32, 34 is a display for showing the result calculated by calculator 31, and 35 is a printer for printing out the result calculated by calculator 31.

In the computer system of the present embodiment, the following steps can be employed to obtain the optimal peak power density in a wavelength converting system in which radiated light of wavelength ½λ is obtained by causing light of wavelength λ to input to a nonlinear optical crystal under conditions of a prescribed repetition frequency and crystal length.

First, a data group comprising the peak power density and the conversion efficiency of the incident light is input from input device 32. The input process may be performed manually, or a transmission signal from a measuring device that measures the conversion efficiency may directly input the data, without employing a manual input step. A plurality of these input data groups are then stored in memory 33.

Next, the calculator 31 extracts the maximum conversion efficiency from among the conversion efficiency data in the multiple data groups that were stored in memory 33. The peak power density that provides this maximum conversion efficiency is then determined. Note that it is also acceptable to extract the maximum conversion efficiency and the peak power density at that time from continuous data obtained using an approximation formula corresponding to the data groups. As a result, the peak power density that provides the maximum conversion efficiency can be obtained without being effected by errors in individual conversion efficiency datum.

The peak power density that provides the maximum conversion efficiency that was determined by calculator 31, i.e., the optimal peak power density, is displayed on display 34 as well as printed out by printer 35.

According to the present embodiment, an operator operating a wavelength converting system in which radiated light of wavelength ½λ is obtained by causing light of wavelength λ to input to a nonlinear optical crystal under conditions of a prescribed repetition frequency and crystal length, is able to set a suitable peak power density by referring to the optimal peak power density which is displayed and printed out. Further, if the maximum peak power density output is directly input into the laser oscillator, then the peak power density of the incident light can be automatically controlled.

Figure 7:
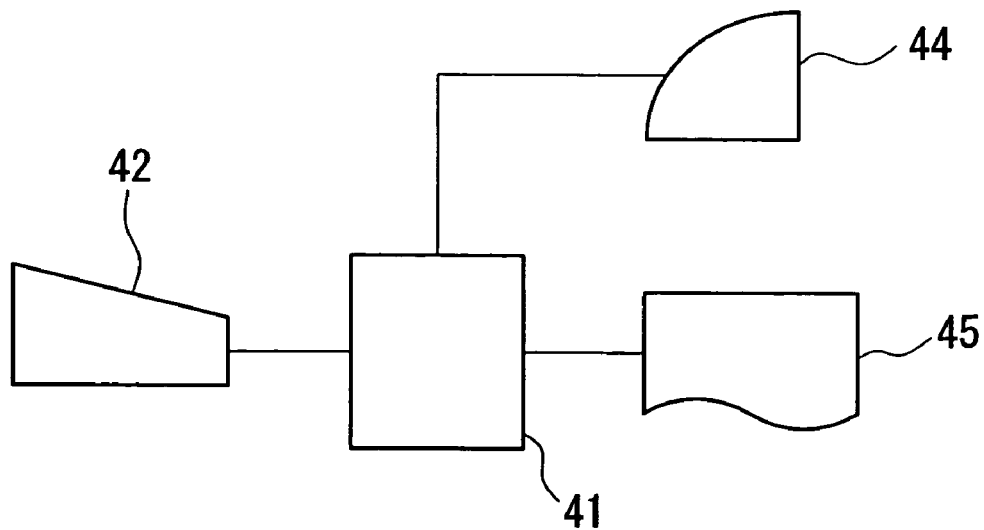
FIG. 7 is structural view of another example of the computer system which activates functions according to the program of the present invention.

FIG. 7 is a structural view of another example of the computer system that activates functions according to the program of the present invention. In FIG. 7, reference symbol 41 is a calculator, 42 is an input device, 44 is a display for displaying the result calculated by calculator 41, and 45 is a printer for printing out the result calculated by the calculator 41.

In the computer system of the present embodiment, the following steps can be employed to obtain the optimal peak power density in a wavelength converting system in which radiated light of wavelength ½λ is obtained by causing light of wavelength λ to input to a nonlinear optical crystal under conditions of a prescribed repetition frequency and crystal length.

First, preset values comprising repetition frequency Rep and constants α and β are input manually from input device 42. Note that α and β are determined in advance based on experimental results.

Next, calculator 41 calculates the optimal peak power density based on the following Formula (1)

$$Pc = \alpha \cdot Rep^{\beta} \quad (1)$$

(Where: Rep=repetition frequency and α and β are constants.)

The optimal peak power density determined by calculator 41 is displayed on display 44 and is printed out by printer 45.

According to the present embodiment, an operator operating a wavelength converting system in which radiated light of wavelength ½λ is obtained by causing light of wavelength λ to input to a nonlinear optical crystal under conditions of a prescribed repetition frequency and crystal length is able to set a suitable peak power density by referring to the optimal peak power density which is displayed and printed out. Moreover, if the maximum peak power density output is directly input into the laser oscillator, then the peak power density of the incident light can be automatically controlled.

Another embodiment of the present invention will now be explained with reference to FIGS. 8 and 9.

Figure 8:
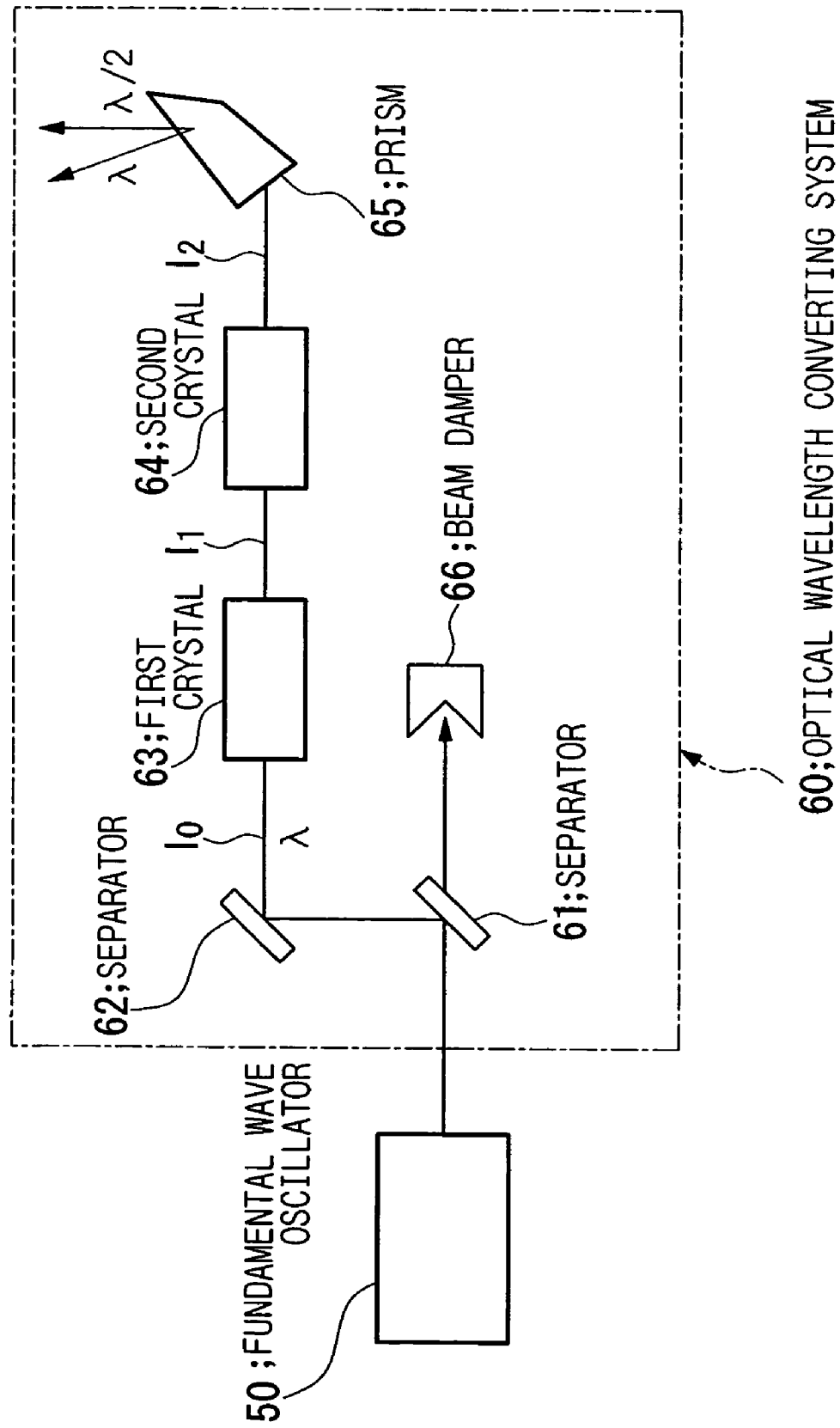
FIG. 8 is a structural view showing the laser oscillating system according to another embodiment of the present invention.

FIG. 8 is a structural view showing the laser oscillating system according to this embodiment. The laser oscillating system in FIG. 8 comprises a fundamental wave oscillator 50 and an optical wavelength converting system 60.

Fundamental wave oscillator 50 may be composed of single laser oscillator such as an Nd:YAG laser, or may be composed of a laser oscillator and a converter that wavelength converts the light oscillated by this laser oscillator.

Wavelength converting system 60 is composed of separators 61,62 for separating fundamental waves of wavelength λ radiated from fundamental wave oscillator 50 from light of other wavelengths; a first crystal 63 to which fundamental waves separated by separators 61 and 62 are input as incident light I0; second crystal 64 to which radiated light I1 from first crystal 63 is input; prism 65 for separating radiated light I2 radiated from second crystal 64; and beam damper 66 for absorbing light of wavelengths other than the fundamental waves that was separated by separator 61.

First crystal 63 and second crystal 64 are different types of nonlinear optical crystals, and are disposed so as to satisfy the phase matching angle with respect to fundamental wave λ.

Applicable nonlinear optical crystals that can be employed for first crystal 63 and second crystal 64 include, for example, LB4 ($Li_2B_4O_7$), KTP ($KTiOPO_4$), BBO ($\beta$-$BaB_2O_4$), CLBO ($CsLiB_6O_{10}$), LBO ($LiB_3O_5$), KDP ($KH_2PO_4$), and the like. First crystal 63 and second crystal 64 are each selected from among these nonlinear optical crystals after giving consideration to their conversion efficiency and resistance to damage, as will be explained below.

First, both crystals are selected so that first crystal 63 is provided with a higher resistance to damage from light than second crystal 64. Specifically, when the bulk damage threshold with respect to the fundamental wave is compared, the crystals are selected to have a relationship such that first crystal 63 has a larger bulk damage threshold than second crystal 64.

This bulk damage threshold is the threshold for the peak power density of the incident light at which bulk damage occurs (i.e., the peak power density of the peak value). Bulk damage is the damage that occurs when incident light damages the chemical bonds of the crystal.

The shorter the wavelength of the incident light, or the longer the time pulse width becomes, the lower the bulk damage threshold. However, the size relationship between the bulk damage threshold values of different crystals at a given wavelength or time pulse width does not vary, even when the wavelength and time pulse width conditions are changed.

For example, the bulk damage threshold for the main nonlinear optical crystals at a wavelength of 1064 nm and a time pulse width of 1 n sec has the values as shown below. The size relationship between these threshold values does not vary under other conditions and is as shown below.

(Bulk damage threshold at wavelength=1064 nm, time pulse width=1 n sec)
LB4: ~90 $GW/cm^2$
LBO: ~45 $GW/cm^2$
CLBO: ~26 $GW/cm^2$
KDP: ~14 $GW/cm^2$
BBO: ~13 $GW/cm^2$
KTP: ~0.6 $GW/cm^2$ (Size relationship between bulk damage threshold values)
LB4>LBO>CLBO>KDP>BBO>KTP In addition to bulk damage, another type of light damage is surface damage occurring from the crystal surface. In general, the bulk damage threshold is larger than the surface damage threshold. Accordingly, the peak power density of the incident light that causes crystal breakdown is usually determined based on the surface damage. However, the surface damage threshold will change according to how polished the surface is, the presence or absence of water absorption, the extent to which the incident light is condensed, etc., so that an objective comparison is difficult. Accordingly, when evaluating the property of resistance to light damage, it is appropriate to employ the bulk damage threshold.

Next, the crystals are selected so that second crystal 64 was provided with higher conversion efficiency than first crystal 63. Specifically, the crystals are selected according to a relationship such that, when comparing the effective nonlinear constant with respect to the fundamental wave, second crystal 64 has a larger effective nonlinear constant than first crystal 63.

The effective nonlinear constant is the effective conversion coefficient calculated from the nonlinear constant of the nonlinear optical crystal and the incident angle. The incident angle is selected so that there is phase matching in accordance with the wavelength of the incident light. Thus, provided that the wavelength of the incident light is determined, then it is possible to actually compare the effective nonlinear constant of each crystal.

For example, the effective nonlinear constants at a wavelength of 1064 nm for the main nonlinear optical crystals are as follows, with the crystals having the size relationship shown below with respect to this constant.

(Effective nonlinear constants and phase matching angles at 1064 nm wavelength)
LB4: 0.08 pm/V, 31°
LBO: 1.05 pm/V, 90° (type I)
CLBO: 0.47 pm/V, 29.4° (type I)
0.95 pm/V, 42.9° (type II)
BBO: 1.64 pm/V, 22.9° (type I)
1.25 pm/V, 33.1° (type II)
KDP: 0.27 pm/V, 41.2° (type I)
0.34 pm/V, 59.2° (type II)
KTP: 3.24 pm/V, 90° (type II)

(Size relationship between effective nonlinear constants at 1064 nm wavelength)
KTP>BBO>LBO>CLBO>KDP>LB4

When selecting LB4, which has the largest bulk damage threshold, for use as first crystal 63, there are various nonlinear crystals that can be selected for use as second crystal 64. However, the incident light wavelength range that is employed must be limited to a range in which the effective nonlinear constant of second crystal 64 becomes larger than the effective nonlinear constant of first crystal 63 (LB4). The wavelength ranges in which the effective nonlinear constant of the various crystals becomes larger than the effective nonlinear constant of LB4 is as follows.

(Incident light wavelength range for obtaining effective nonlinear constant larger than that of LB4)
LBO: 2000–500 nm
CLBO: 2000–472 nm
BBO: 1400–409 nm
KDP: 1300–500 nm
KTP: 2000–990 nm In the laser oscillating system according to the present invention, incident light I0, which is a fundamental wave of wavelength $\lambda$, is input to first crystal 63. Radiated light I1 from first crystal 63 is composed of the second harmonic wave, wavelength $\lambda/2$, and fundamental waves of wavelength $\lambda$ that passed through first crystal 63 without being converted. Here, since a portion of incident light I0 is converted into the second harmonic wave, the peak power density of the fundamental waves that are included in radiated light I1 has become smaller than the peak power density of the incident light I0. For this reason, it is possible to set the peak power density of the incident light I0 to a higher value than in the case where light is directly input to second crystal 64.

Figure 9:
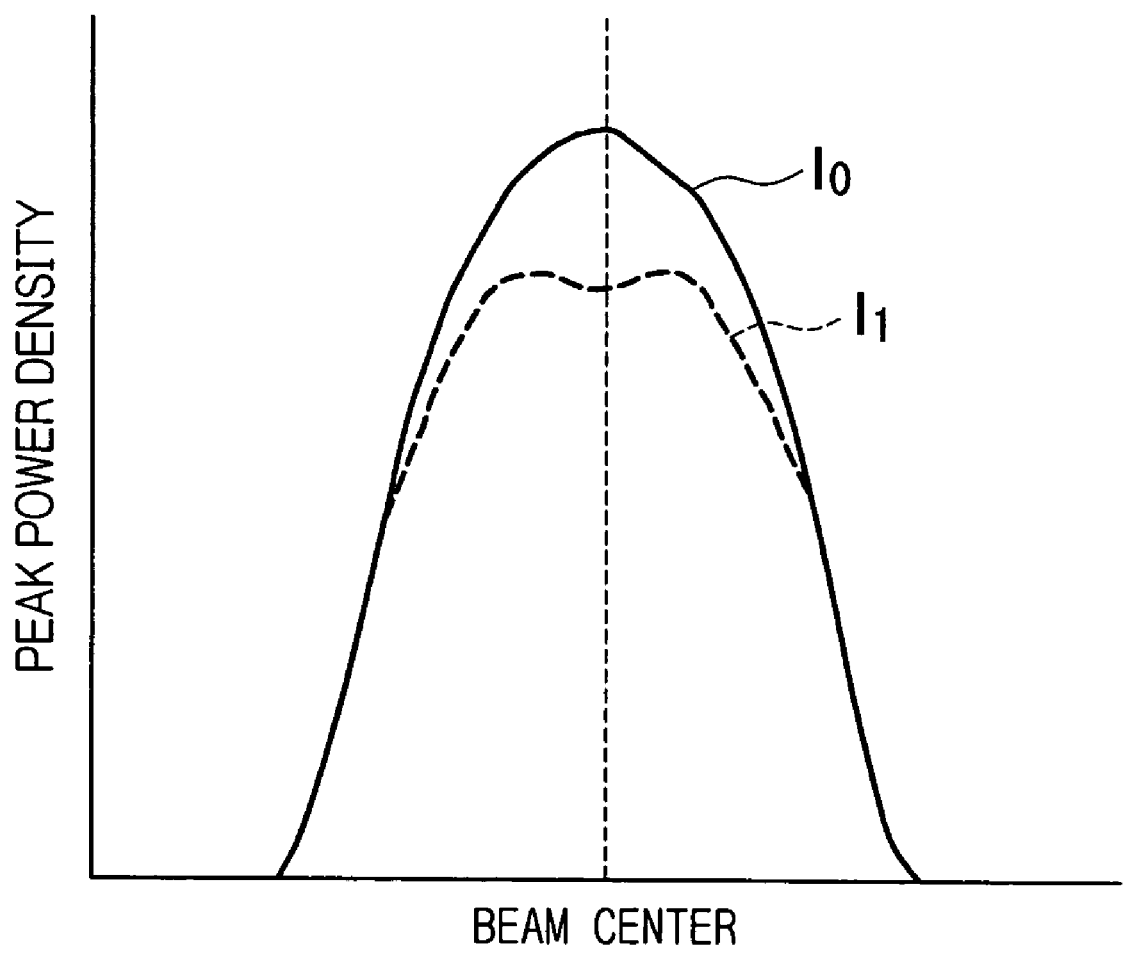
FIG. 9 is a graph showing how the peak power density varies using the first crystal.

In this case, as shown in FIG. 9, the effect of protecting second crystal 64 with first crystal 63 is not limited to the range of the conversion efficiency of first crystal 63. Namely, as shown by the solid line in FIG. 9, incident light I0 is distributed within the beam diameter range such that the maximum peak power density occurs at the beam center. Light near the beam center where a high peak power density is obtained is most apt to cause damage to the crystal. On one hand, this light near the beam center having this high peak power density is most easily converted. For this reason, the peak power density of the fundamental waves included in radiated light I1 decreases greatly near the beam center, as shown by the wavy line in FIG. 9. Accordingly, it is possible to greatly reduce the impact on second crystal 64.

In addition, because the conversion efficiency of first crystal 63 is relatively low, a large portion of the fundamental waves (wavelength $\lambda$) in incident light I0 pass though first crystal 63 without being converted, and are included in radiated light I1. However, because the conversion efficiency of second crystal 64 is high, it is possible to obtain a high power second harmonic wave (wavelength $\lambda/2$) as radiated light I2. Further, the fundamental waves remaining in radiated light I2 are separated at prism 65, so that only the second harmonic wave can be output. Note that a separator may be employed in place of prism 65.

The present embodiment employs a first crystal 63 and a second crystal 64 having a specific relationship with respect to their resistance to light damage and their conversion efficiency. As a result, the deficits of each crystal are compensated for, so that an overall high conversion efficiency and high resistance to light damage can be realized. Accordingly, the high power second harmonic wave can be obtained with good efficiency.

Note that while the discussion of the preceding embodiments concerned itself with the second harmonic wave, the present invention can be broadly applied to sum frequency wave generation. For example, when generating the third harmonic wave, the laser oscillating system according to the embodiment shown in FIG. 8 can be composed by replacing separators 61 and 62 with a mirror that reflects both the fundamental and second harmonic waves, and by eliminating beam damper 66. Alternatively, a design is also possible in which any one of separators 61 and 62 and beam damper 66 are omitted, and fundamental and second harmonic waves from an oscillator that simultaneously generates fundamental and second harmonic waves are made to input to first crystal 63 directly.

EXAMPLES

Example 1

In the laser oscillating system shown in FIG. 8, LB4 which was 5 mm×5 mm in cross section and had a length of 35 mm was employed for first crystal 63, and BBO which was 5 mm×5 mm in cross section and had a length of 7 mm was employed for second crystal 64. Second harmonic waves were generated using green laser with an average power of 30 W, a repetition frequency of 10 kHz, a pulse width of 30 n sec, a beam diameter of 0.5 mm and a wavelength of 532 nm, as incident light I0.

The average peak power density of incident light I0 was 51 MW/cm$^2$ at this time, while the power and average peak power density of the fundamental waves (532 nm) that remained in radiated light I1 were 28.5 W and 48.4 MW/cm$^2$, respectively. Ultraviolet light (266 nm) with a stable output of 6.3 W was obtained as radiated light I2.

Note that when a typical beam (532 nm) having an average peak power density of 48.2 MW/cm$^2$ is input to BBO, bulk damage will occur. In the case of this example, however, the practical peak power density is decreasing, as explained by FIG. 9, so that bulk damage did not occur.

Comparative Example 1

BBO that was 5 mm×5 mm in cross section and had a length of 7 mm was employed for both first crystal 63 and second crystal 64 in the laser oscillating system shown in FIG. 8. The conditions for the incident light I0 were the same as those employed in Example 1.

In this case, however, the BBO incurred bulk damage from incident light I0, so that it could not be used.

Example 2

In the laser oscillating system shown in FIG. 8, LB4 which was 5 mm×5 mm in cross section and had a length of 35 mm was employed for first crystal 63, and CLBO which was 5 mm×5 mm in cross section and had a length of 10 mm was employed for second crystal 64. Second harmonic waves were generated using a green laser as incident light I0 under the same conditions as in Example 1, i.e., with an average power of 30 W, a repetition frequency of 10 kHz, a pulse width of 30 n sec, a beam diameter of 0.5 mm and a wavelength of 532 nm.

The average peak power density of incident light I0 was 51 MW/cm$^2$ at this time, while the power and the average peak power density of the fundamental waves (532 nm) that remained in radiated light I1 were 28.5 W and 48.4 MW/cm$^2$, respectively. Ultraviolet light (266 nm) with a stable output of 6.5 W was obtained as radiated light I2.

Note that when a typical beam (532 nm) having an average peak power density of 48.4 MW/cm$^2$ is input to CLBO, bulk damage will occur. In the case of this example, however, the practical peak power density is decreasing, as explained by FIG. 9, so that bulk damage did not occur.

Comparative Example 2

CLBO that was 5 mm×5 mm in cross section and had a length of 10 mm was employed for both first crystal 63 and second crystal 64 in the laser oscillating system shown in FIG. 8. The conditions for the incident light I0 were the same as those employed in Examples 1 and 2.

In this case, however, the CLBO incurred bulk damage from incident light I0, so that it could not be used.

Comparative Example 3

In the laser oscillating system shown in FIG. 8, LB4 that was 5 mm×5 mm in cross section and had a length of 35 mm was employed for both first crystal 63 and second crystal 64. The conditions for incident light I0 were the same as those employed in Examples 1 and 2.

The average peak power density of incident light I0 was 51 MW/cm$^2$ at this time, while the power and the average peak power density of the fundamental waves (532 nm) that remained in radiated light I1 were 28.5 W and 48.4 MW/cm$^2$, respectively. Ultraviolet light (266 nm) with an output of 3 W was obtained as radiated light I2.

While the output of radiated light I2 was stable and bulk damage did not occur, the radiated light output in this comparative example was low as compared to the 6.3 W obtained in Example 1 and the 6.5 W obtained in Example 2.

Example 3

A mirror for reflecting both fundamental and second harmonic waves was employed in place of separators 61 and 62, and beam damper 66 was omitted from the laser oscillating system according to the embodiment shown in FIG. 8. Sum frequency waves were then generated using this thus-modified laser oscillating system.

LB4 that was 5 mm×5 mm in cross section and had a length of 35 mm was employed for first crystal 63, and LBO which was 5 mm×5 mm in cross section and had a length of 15 mm was employed for second crystal 64 in this laser oscillating system. A fundamental wave laser having a wavelength of 1064 nm and an average power of 10 W, and second harmonic waves having a wavelength of 532 nm and an average power of 10 W, were employed for incident light I0, to generate an ultraviolet laser of wavelength 355 nm, which is the third harmonic wave.

Regarding this incident light I0, the repetition frequency was 10 kHz, the fundamental wave laser's pulse width and beam diameter were 30 n sec and 0.3 mm, respectively, and the second harmonic wave laser's pulse width and beam diameter were 27 n sec and 0.2 mm, respectively.

The average peak power densities of the fundamental wave laser and the second harmonic wave laser in incident light I0 at this time were, respectively, 47 MW/cm$^2$ and 118 MW/cm$^2$. The power of the fundamental waves that remained in radiated light I1 and the second harmonic waves were, respectively, 9.5 W and 9.5 W, and the average peak power densities of these fundamental waves and second harmonic waves were, respectively, 45 MW/cm$^2$ and 112 MW/cm$^2$. Third harmonic waves (355 nm) having a stable output of 5 W were obtained as radiated light I2.

Note that when a typical beam (532 nm) in which the average peak power density is 112 MW/cm$^2$ is input to LBO, bulk damage will occur. In the case of this example, however, the practical peak power density is decreasing, as explained by FIG. 9, so that bulk damage did not occur.

Comparative Example 4

LBO that was 5 mm×5 mm in cross section and had a length of 10 mm was employed for both first crystal 63 and second crystal 64 in a laser oscillating system equivalent to that of Example 3. The conditions for the incident light I0 were the same as those employed in Example 3.

In this case, however, the LBO gradually incurred bulk damage from the second harmonic waves (532 nm) in incident light I0, so that the duration of time during which it could be employed was limited, i.e., stable use over a long period of time was not possible.

Comparative Example 5

LB4 that was 5 mm×5 mm in cross section and had a length of 35 mm was employed for both first crystal 63 and second crystal 64 in a laser oscillating system equivalent to that of Example 3. The conditions for the incident light I0 were the same as those employed in Example 3.

Third harmonic waves (355 nm) with a stable output of 2 W were obtained as radiated light I2 in this case.

While the output of radiated light I2 was stable and bulk damage did not occur, however, the output value was low when compared to the 5 watts obtained in Example 3.

Example 4

A mirror for reflecting both first and second fundamental waves was employed in place of separators 61 and 62, and beam damper 66 was omitted from the laser oscillating system according to the embodiment shown in FIG. 8. Sum frequency waves were then generated using this thus-modified laser oscillating system.

LB4 which was 5 mm×5 mm in cross section and had a length of 20 mm was employed for first crystal 63, and BBO which was 5 mm×5 mm in cross section and had a length of 15 mm was employed for second crystal 64 in this laser oscillating system. Third harmonic waves of an Nd:YAG laser (first fundamental wave) having a wavelength of 355 nm and an average power of 5 W, and a Ti: sapphire laser (second fundamental wave) having a wavelength of 828 nm and an average power of 5 W, were employed as the incident light I0, to generate ultraviolet laser of wavelength 248 nm, which is the sum frequency wave.

Regarding this incident light I0, the repetition frequency was 10 kHz, the first fundamental wave's (355 nm) pulse width and beam diameter were 25 n sec and 0.2 mm, respectively, and the second fundamental wave's (828 nm) pulse width and beam diameter were 15 n sec and 0.2 mm, respectively.

The average peak power densities of the first fundamental wave (355 nm) and the second fundamental wave (828 nm) in incident light I0 were, respectively, 64 MW/cm$^2$ and 106 MW/cm$^2$. The power of the first fundamental wave (355 nm) that remained in radiated light I1 and the second fundamental wave (828 nm) were, respectively, 4.85 W and 4.85 W. The average peak power densities were 62 MW/cm$^2$ and 103 MW/cm$^2$, respectively. Sum frequency waves (248 nm) with a stable output of 0.8 W were obtained as radiated light I2.

Note that when a typical beam (355 nm) in which the average peak power density is 62 MW/cm$^2$ is input to BBO, bulk damage will occur. In the case of this Example, however, the practical peak power density is decreasing, as explained by FIG. 9, so that bulk damage did not occur.

Comparative Example 5

BBO that was 5 mm×5 mm in cross section and had a length of 15 mm was employed for both first crystal 63 and second crystal 64 in a laser oscillating system equivalent to that of Example 4. The conditions for the incident light I0 were the same as those employed in Example 4.

In this case, however, the BBO gradually incurred bulk damage from the first fundamental waves (355 nm) in incident light I0, so that the duration of time during which it could be employed was limited, i.e., stable use over a long period of time was not possible.

Comparative Example 6

LB4 that was 5 mm×5 mm in cross section and had a length of 20 mm was employed for both first crystal 63 and second crystal 64 in a laser oscillating system equivalent to that of Example 4. The conditions for the incident light I0 were the same as those employed in Example 4.

Sum frequency waves (248 nm) with a stable output of 0.4 W were obtained as radiated light I2 in this case.

While the output of radiated light I2 was stable and bulk damage did not occur, the output value was low when compared to the 0.8 W obtained in Example 4.

INDUSTRIAL APPLICABILITY

As explained in detail above, in the wavelength converting method and wavelength converting system according to the present invention, wavelength conversion is carried out to incident light that has a peak power density that is below, but near, the optimal peak power density. As a result, a stable high conversion efficiency can be achieved using a nonlinear optical crystal single crystal, and in particular lithium tetraborate LB4. Thus, by means of the present invention, an all solid state ultraviolet laser oscillator, which offers durability with respect to practical applications, can be employed.

In addition, the optimal peak power density can be easily obtained using the program and recording medium according to the present invention. Thus, an operator operating a wavelength converting system in which radiated light of wavelength ½λ is obtained by causing light of wavelength λ to input to a nonlinear optical crystal under conditions of a prescribed repetition frequency and crystal length, is able to set a suitable peak power density.

In addition, because it is possible to increase the optimal peak power density in the wavelength converting method and wavelength converting system according to the present invention, a stable output can be obtained even if the peak power density of the incident light is high. As a result, stable high conversion efficiency can be achieved using a nonlinear optical crystal such as lithium tetraborate single crystal LB4. Accordingly, an all solid state ultraviolet laser oscillator, which offers durability with respect to practical applications, can be employed.

Moreover, by combining different types of nonlinear optical crystals that have a specific relationship to one another in the present invention, the individual deficits of the various crystals are compensated for, so that a high conversion efficiency and high resistance to light damage can be realized overall. Accordingly, such high power sum frequencies as second harmonic waves can be obtained with good efficiency.

The invention claimed is:

1. An optical wavelength converting method in which light of a prescribed repetition frequency from a laser oscillator that oscillates coherent light of an inherent wavelength λ is employed as incident light, and is made to input to a nonlinear optical crystal having a prescribed crystal length, and light having a wavelength of ½ λ is radiated, wherein the wavelength of the incident light is 1000 nm or less, and the peak power density of the incident light is 0.1–10 fold greater than the peak power density that provides the maximum conversion efficiency.

2. An optical wavelength converting method according to claim 1, wherein the nonlinear optical crystal is a lithium tetraborate ($Li_2B_4O_7$) single crystal.

3. An optical wavelength converting method according to claim 2, wherein the incident light has a beam spreading of 10 m rad or less, a time pulse width of 100 n sec or less, and a peak power density of 1 $MW/cm^2$ or greater.

4. An optical wavelength converting method according to claim 1, wherein the incident light has a beam spreading of 10 m rad or less, a time pulse width of 100 n sec or less, and a peak power density of 1 $MW/cm^2$ or greater.

5. An optical wavelength converting method in which light of a prescribed repetition frequency from a laser oscillator that oscillates coherent light of an inherent wavelength λ is employed as incident light and is made to input to a lithium tetraborate ($Li_2B_4O_7$) single crystal having a prescribed crystal length, and light having a wavelength of ½λ is radiated, wherein the wavelength of the incident light is 1000 nm or less, and the peak power density of the incident light is 0.1–10 fold greater than the optimal peak power density Pc obtained by the following formula (1).

$$Pc = \alpha \cdot Rep^\beta \qquad (1)$$

(Where: Rep=repetition frequency, and α and β are constants.)

6. An optical wavelength converting method according to claim 5, wherein the incident light has a beam spreading of 10 m rad or less, a time pulse width of 100 n sec or less, and a peak power density of 1 $MW/cm^2$ or greater.

7. An optical wavelength converting system provided with a laser oscillator for oscillating coherent light having an inherent wavelength λ, and a nonlinear optical crystal of a prescribed crystal length in which light of a prescribed repetition frequency from the laser oscillator is employed as incident light, and light having a wavelength of ½λ is radiated, wherein the wavelength of the incident light is 1000 nm or less, and the peak power density of the incident light is 0.1–10 fold greater than the peak power density that provides the maximum conversion efficiency.

8. An optical wavelength converting system that is provided with a laser oscillator for oscillating coherent light of an inherent wavelength λ, and a lithium tetraborate ($Li_2B_4O_7$) single crystal of a prescribed crystal length in which light of a prescribed repetition frequency from the laser oscillator is employed as incident light, and light having a wavelength of ½λ is radiated, wherein the wavelength of the incident light is 1000 nm or less, and the peak power density of the incident light is 0.1–10 fold greater than the optimal peak power density Pc obtained from the following Formula (1).

$$Pc = \alpha \cdot Rep^\beta \qquad (1)$$

(Where: Rep=repetition frequency, and α and β are constants.)

9. An optical wavelength converting method which employs light from a laser oscillator that oscillates coherent light of inherent wavelength λ as incident light, inputs the light to a nonlinear optical crystal and radiates out light of wavelength ½λ, wherein the nonlinear optical crystal is heated to and maintained at 200–600° C.,
   wherein the incident light has beam spreading of 10 m rad or less, a time pulse width of 100 n sec or less, and a peak power density of 1 MW/cm² or more.

10. An optical wavelength converting method according to claim 9, wherein the wavelength of the incident light is 1000 nm or less.

11. An optical wavelength converting system comprising: a laser oscillator that oscillates coherent light of inherent wavelength λ; a nonlinear optical crystal in which light from the laser oscillator is employed as incident light, and light of wavelength ½λ is radiated; and a heating section that heats and maintains the nonlinear optical crystal at 200–600° C.,
   wherein the incident light has beam spreading of 10 m rad or less, a time pulse width of 100 n sec or less, and a peak power density of 1 MW/cm² or more.

12. An optical wavelength converting method in which light from a laser oscillator, that oscillates coherent light of inherent wavelength λ as incident light, is input to a lithium tetraborate ($Li_2B_4O_7$) single crystal, and light of wavelength ½λ is radiated, wherein the lithium tetraborate ($Li_2B_4O_7$) single crystal is heated to and maintained at 50–600° C.,
   wherein the incident light has beam spreading of 10 m rad or less, a time pulse width of 100 n sec or less, and a peak power density of 1 MW/cm² or more.

13. An optical wavelength converting method according to claim 12, wherein the wavelength of the incident light is 1000 nm or less.

14. An optical wavelength converting system comprising: a laser oscillator that oscillates coherent light of an inherent wavelength λ; a lithium tetraborate ($Li_2B_4O_7$) single crystal that employs light from the laser oscillator as incident light and radiates light of wavelength ½λ; and a heating section that heats and maintains the lithium tetraborate single crystal at 50–600° C.,
   wherein the incident light has beam spreading of 10 m rad or less, a time pulse width of 100 n sec or less, and a peak power density of 1 MW/cm² or more.

15. An optical wavelength converting method in which fundamental waves of a prescribed wavelength and time pulse width are input to a first nonlinear optical crystal and a second nonlinear optical crystal sequentially, and the second harmonic of the fundamental waves is generated, wherein
   the bulk damage threshold of the first nonlinear optical crystal with respect to the fundamental wave is larger than that of the second nonlinear optical crystal, and the effective nonlinear constant of the second nonlinear optical crystal with respect to the second harmonic wave generation of the fundamental waves is larger than that of the first nonlinear optical crystal.

16. An optical wavelength converting method according to claim 15, wherein the first nonlinear optical crystal is lithium tetraborate ($Li_2B_4O_7$) single crystal.

17. An optical wavelength converting method according to claim 16, wherein the second nonlinear optical crystal is $LiB_3O_5$, $CsLiB_6O_{10}$, $KTiOPO_4$, or $\beta$-$BaB_2O_4$.

18. An optical wavelength converting method in which a first fundamental wave of a prescribed wavelength and time pulse width and a second fundamental wave of a prescribed wavelength and time pulse width are input to a first nonlinear optical crystal and a second nonlinear optical crystal sequentially, and the sum frequency wave of the first fundamental wave and the second fundamental wave are generated, wherein
   the bulk damage threshold of the first nonlinear optical crystal with respect to the first fundamental wave is larger than that of the second nonlinear optical crystal, and the effective nonlinear constant of the second nonlinear optical crystal with respect to the sum frequency wave generation from the first fundamental wave and the second fundamental wave is larger than that of the first nonlinear optical crystal.

19. An optical wavelength converting method according to claim 18, wherein the first nonlinear optical crystal is lithium tetraborate ($Li_2B_4O_7$) single crystal.

20. An optical wavelength converting system comprising: a first nonlinear optical crystal to which a fundamental wave of a prescribed wavelength and time pulse width is input and a second harmonic wave is generated; and a second nonlinear optical crystal to which radiated light from the first nonlinear optical crystal is input and a second harmonic wave of the fundamental wave is generated, wherein
   the bulk damage threshold of the first nonlinear optical crystal with respect to the fundamental wave is larger than that of the second nonlinear optical crystal, and
   the effective nonlinear constant of the second nonlinear optical crystal with respect to the second harmonic wave generation of the fundamental wave is larger than that of the first nonlinear optical crystal.

21. A laser oscillating system comprising: a fundamental wave oscillator for oscillating a fundamental wave of a prescribed wavelength and time pulse width; and an optical wavelength converting system to which the fundamental wave from the fundamental wave oscillator is input and a second harmonic wave is generated, wherein the optical wavelength converting system is the optical wavelength converting system according to claim 20.

22. An optical wavelength converting system comprising: a first nonlinear optical crystal to which a first fundamental wave of a prescribed wavelength and time pulse width and a second fundamental wave of a prescribed wavelength and time pulse width are input, and the sum frequency wave of the first fundamental wave and the second fundamental wave is generated; and a second nonlinear optical crystal to which radiated light from the first nonlinear optical crystal is input and the sum frequency wave is generated, wherein
   the bulk damage threshold of the first nonlinear optical crystal with respect to the first fundamental wave is larger than that of the second nonlinear optical crystal, and
   the effective nonlinear constant of the second nonlinear optical crystal with respect to the sum frequency wave generation from the first fundamental wave and the second fundamental wave is larger than that of the first nonlinear optical crystal.

23. A laser oscillating system comprising: a fundamental wave oscillator for oscillating a first fundamental wave of a prescribed wavelength and time pulse width and a second fundamental wave of a prescribed wavelength and time pulse width; and an optical wavelength converting system to which the first fundamental wave and the second fundamental wave from the fundamental wave oscillator are input and a sum frequency wave is generated, wherein the optical wavelength converting system is the optical wavelength converting system according to claim 22.

* * * * *